(12) United States Patent
Hashimoto et al.

(10) Patent No.: US 9,020,047 B2
(45) Date of Patent: Apr. 28, 2015

(54) IMAGE DECODING DEVICE

(75) Inventors: Takashi Hashimoto, Hyogo (JP);
Yoshiyuki Wada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1183 days.

(21) Appl. No.: 12/301,870

(22) PCT Filed: May 23, 2007

(86) PCT No.: PCT/JP2007/060530
§ 371 (c)(1),
(2), (4) Date: Jun. 25, 2010

(87) PCT Pub. No.: WO2007/136093
PCT Pub. Date: Nov. 29, 2007

(65) Prior Publication Data
US 2010/0266049 A1  Oct. 21, 2010

(30) Foreign Application Priority Data
May 24, 2006  (JP) .................................. 2006-143839

(51) Int. Cl.
*H04N 7/12* (2006.01)
*H04N 19/436* (2014.01)
*H04N 19/176* (2014.01)
*H04N 19/70* (2014.01)
*H04N 19/61* (2014.01)
*H04N 19/156* (2014.01)
(Continued)

(52) U.S. Cl.
CPC ........... *H04N 19/436* (2014.11); *H04N 19/176* (2014.11); *H04N 19/70* (2014.11); *H04N 19/61* (2014.11); *H04N 19/156* (2014.11); *H04N 19/174* (2014.11); *H04N 19/44* (2014.11)

(58) Field of Classification Search
CPC combination set(s) only.
See application file for complete search history.

(56) References Cited

U.S. PATENT DOCUMENTS

| 5,504,823 | A |   | 4/1996 | Yoon |
| 5,510,842 | A | * | 4/1996 | Phillips et al. ........... 375/240.25 |
| 5,532,744 | A | * | 7/1996 | Akiwumi-Assani et al. ......................... 348/390.1 |

(Continued)

FOREIGN PATENT DOCUMENTS

| JP | 6-85691 | 3/1994 |
| JP | 6-225278 | 8/1994 |

(Continued)

OTHER PUBLICATIONS

International Search Report issued Aug. 22, 2008 in International (PCT) Application No. PCT/JP2007/060530.

(Continued)

*Primary Examiner* — Dave Czekaj
*Assistant Examiner* — Kehinde O Abimbola
(74) *Attorney, Agent, or Firm* — Wenderoth, Lind & Ponack, L.L.P.

(57) ABSTRACT

An image decoding apparatus includes a plurality of decoders and (i) divides image data to decode into a plurality of pieces of partial data, (ii) acquires attribute information pieces each affecting decoding processing time of a corresponding one of the plurality of pieces of partial data, (iii) determines which of the plurality of decoders is caused to decode which of the plurality of pieces of partial data based on the attribute information pieces on the plurality of pieces of partial data and (iv) causes two or more of the plurality of decoders to decode two or more corresponding pieces of the partial data in parallel.

17 Claims, 19 Drawing Sheets

(51) Int. Cl.
*H04N 19/174* (2014.01)
*H04N 19/44* (2014.01)

(56) References Cited

U.S. PATENT DOCUMENTS

| | | | |
|---|---|---|---|
| 5,623,311 A | 4/1997 | Phillips et al. | |
| 5,767,797 A * | 6/1998 | Yogeshwar et al. | 341/50 |
| 5,874,995 A | 2/1999 | Naimpally et al. | |
| 5,920,352 A | 7/1999 | Inoue | |
| 6,275,536 B1 | 8/2001 | Chen et al. | |
| 6,414,997 B1 * | 7/2002 | Piccinelli et al. | 375/240.17 |
| 6,563,876 B2 * | 5/2003 | Boyce et al. | 375/240.15 |
| 6,775,327 B2 * | 8/2004 | Ngai | 375/240.25 |
| 6,996,170 B2 * | 2/2006 | Thoumy et al. | 375/240 |
| 6,996,179 B2 * | 2/2006 | Rovati et al. | 375/240.16 |
| 7,072,393 B2 * | 7/2006 | Boice et al. | 375/240.01 |
| 7,227,589 B1 * | 6/2007 | Yeo et al. | 348/721 |
| 7,486,734 B2 * | 2/2009 | Machida | 375/240.25 |
| 8,204,131 B2 * | 6/2012 | Zador et al. | 375/240.25 |
| 2003/0138045 A1 * | 7/2003 | Murdock et al. | 375/240.12 |
| 2003/0161395 A1 * | 8/2003 | Byers | 375/240.01 |
| 2003/0227969 A1 * | 12/2003 | Wise et al. | 375/240.1 |
| 2004/0190628 A1 * | 9/2004 | Murayama | 375/240.25 |
| 2005/0147166 A1 * | 7/2005 | Shibata et al. | 375/240.15 |
| 2005/0201459 A1 * | 9/2005 | Hayashi | 375/240.2 |
| 2005/0207497 A1 * | 9/2005 | Rovati et al. | 375/240.16 |
| 2006/0050789 A1 * | 3/2006 | Gisquet et al. | 375/240.23 |
| 2006/0067409 A1 * | 3/2006 | Onoda et al. | 375/240.25 |
| 2006/0120451 A1 * | 6/2006 | Hannuksela | 375/240.12 |
| 2006/0120464 A1 * | 6/2006 | Hannuksela | 375/240.27 |
| 2006/0209960 A1 * | 9/2006 | Katayama et al. | 375/240.16 |
| 2006/0222070 A1 * | 10/2006 | Park et al. | 375/240.08 |
| 2007/0064811 A1 * | 3/2007 | Zador et al. | 375/240.26 |
| 2007/0071332 A1 * | 3/2007 | Katayama | 382/233 |
| 2009/0067502 A1 * | 3/2009 | Jeon et al. | 375/240.16 |
| 2010/0266049 A1 * | 10/2010 | Hashimoto et al. | 375/240.25 |

FOREIGN PATENT DOCUMENTS

| | | |
|---|---|---|
| JP | 8-130745 | 5/1996 |
| JP | 10-178644 | 6/1998 |
| JP | 2000-50255 | 2/2000 |
| JP | 2000-261797 | 9/2000 |
| JP | 2000-295616 | 10/2000 |
| JP | 2001-119699 | 4/2001 |
| JP | 2005-175997 | 6/2005 |
| WO | 96/06505 | 2/1996 |
| WO | 00/79801 | 12/2000 |

OTHER PUBLICATIONS

International Preliminary Examination Report (PCT/IPEA/409) issued Sep. 10, 2008 in International (PCT) Application No. PCT/JP2007/060530.

Supplementary European Search Report issued May 20, 2010 in EP 07 74 3964.

Van der Tol, E. B. et al., *Mapping of H.264 decoding on a multiprocessor architecture*, Image and Video Communications and Processing, vol. 5022 (2003), pp. 707-718.

* cited by examiner

FIG. 5

| IMAGE DECODING UNIT ID | COMPUTING ABILITY | DATA BANDWIDTH (Mbps) |
|---|---|---|
| Dec00 | SDTV | 10 |
| Dec01 | HDTV | 40 |
| Dec02 | HDTV | 80 |
| Dec03 | SDTV | 10 |

FIG. 6

| IMAGE DECODING UNIT ID | ALLOCATION SLICE NUMBER | |
|---|---|---|
| Dec00 | 01 | — |
| Dec01 | 02 | 03 |
| Dec02 | 04 | 05 |
| Dec03 | 06 | — |

FIG. 13

| DECODING ORDER | PICTURE NUMBER (DISPLAY NUMBER) | PICTURE TYPE | REFERENCE PICTURE |
|---|---|---|---|
| 0 | 0 | I | - |
| 1 | 4 | P | 0 |
| 2 | 1 | B | 0, 4 |
| 3 | 2 | B | 0, 4 |
| 4 | 3 | B | 0, 4 |
| 5 | 8 | P | 4 |
| 6 | 5 | B | 4, 8 |
| 7 | 6 | B | 4, 8 |
| 8 | 7 | B | 4, 8 |
| ... | ... | ... | ... |

FIG. 14

| DECODING ORDER | IMAGE DECODING UNIT |
|---|---|
| 0 | Dec00<br>Dec03 |
| 1 | Dec00<br>Dec03 |
| 2 | Dec01 |
| 3 | Dec01 |
| 4 | Dec02 |
| 5 | Dec00<br>Dec03 |
| 6 | Dec01 |
| 7 | Dec02 |
| 8 | Dec02 |
| ... | ... |

FIG. 19

| SLICE NUMBER | IMAGE DECODING UNIT ID |
|---|---|
| 01 | Dec00 |
| 02 | Dec01 |
| 03 | Dec01 |
| 04 | Dec02 |
| 05 | Dec02 |
| 06 | Dec03 |
| 07 | Dec02 |
| ... | ... |

IMAGE DECODING DEVICE

TECHNICAL FIELD

The present invention relates to an image decoding apparatus that decodes encoded image data, and in particular to technology that enhances decoding processing speed when decoding is performed by a plurality of decoders in parallel.

BACKGROUND ART

In recent years, the data amount of images, especially moving images, has been increasing in order to satisfy high-definition and large-screen requirements. Therefore, technology that compresses and encodes moving picture data has been developed in view of the following cases or the like: where such moving picture data which has been increasing in amount is transmitted on a network, and where moving picture data is stored in a storage medium.

For example, there are international standards such as the MPEG-2 (Motion Picture Experts Group), the H264/MPEG-4AVC (Advanced Video Codec) and the like.

Moving picture data that has been encoded according to these standards is usually displayed while being decoded by an image decoding apparatus.

Although the current mainstream image size is 720 pixels 480 lines of standard TV (SDTV), it is expected that the use of an image size of 1920 pixels 1080 lines of high definition TV (HDTV), and the use of image size used in the digital cinema standard in which a screen size is larger will increase.

This digital cinema standard defines an image size of 2048 pixels 1080 lines which is called "the 2K standard", and the image size of 4096 pixels 2160 lines which is called "the 4K standard".

One-chip LSIs for decoding for these image sizes have been developed. However, when decoding is performed by one decoder, high-computing performance and a broad data bandwidth are needed as an image size becomes larger, causing high cost and high power consumption.

Technology has been proposed that realizes a high-performance decoding apparatus for HDTV by causing a plurality of decoders comparatively low in processing ability (e.g. decoders for SDTVs) to perform decoding processing in parallel (see Patent Document 1).

The following briefly describes the decoding apparatus using FIG. 18. Four image decoders (4, 5, 6, 7) which are decoders in each of which a bitstream transmitted from a transport decoder 1 is input (i) select, from bitstreams, slice data to perform decoding on, (ii) decode the selected slice data, and (iii) output the decoded slice data to frame memories (2, 3). Each of the image decoders (4, 5, 6, 7) selects a slice in a numerical order of slices, and starts decoding processing using the same frame memories simultaneously with a timing that each buffer reads data of the selected slice.

According to this technology, it is possible to realize high processing ability even if decoders comparatively low in processing ability are used.

BACKGROUND OF THE INVENTION

Patent Document 1: Japanese published unexamined application No. 10-178644

SUMMARY OF THE INVENTION

However, various technologies that enhance encoding efficiency have been introduced owing to progress in compression and decompression technology, and the number of bits after compression tends to greatly vary between slices.

If the slices are simply allocated to respective decoders in order with the data amount of each slice after compression greatly varying, an imbalance of time required for each decoding processing becomes larger, which causes decoders that have finished decoding processing early to remain idle for a long time.

Therefore, the present invention has an objective to provide an image decoding apparatus that is capable of realizing processing ability higher than individual decoders by efficiently using a plurality of decoders.

In order to achieve the above-stated objective, the image decoding apparatus pertaining to the present invention that decodes encoded image data composed of a plurality of pieces of partial data comprises: a plurality of decoders; an attribute information acquisition unit operable to acquire attribute information pieces each (i) affecting decoding processing time of a corresponding one of the plurality of pieces of partial data, and (ii) indicating at least a data amount of the corresponding one of the plurality of pieces of partial data; a determination unit operable to determine which of the decoders is caused to decode which of the plurality of pieces of partial data based on the acquired attribute information pieces on the plurality of pieces of partial data; and a decoding unit operable to cause the decoders to decode the encoded image data, wherein the decoding unit causes two or more of the decoders which have been determined in the determination unit to decode two or more corresponding pieces of the partial data in parallel.

The image decoding apparatus having the above-stated structure is capable of selecting, for each of the plurality of pieces of partial data composing image data, a decoder which is caused to perform decoding based on an attribute that affects time taken to perform such decoding processing. Therefore, when each of the plurality of pieces of partial data is decoded by a corresponding one of the plurality of decoders in parallel, it is possible to suppress imbalance of decoding processing time between each decoder, which makes it possible to enhance processing efficiency.

That is, time that the decoders do not perform the decoding processing is shortened by determining which of the decoders is caused to decode which piece of the plurality of pieces of partial data so as to reduce variation in processing time between each of the decoders, which makes it possible to realize efficiency of decoding processing of image data.

Also, since a plurality of pieces of partial data composing image data are processed in parallel, it is possible to accurately decode even image data that would need to be decoded by a decoder having higher processing ability than any of the individual decoders under ordinary circumstances.

Furthermore, it is possible to realize, at comparatively low cost, a decoding apparatus that performs decoding processing of image data that requires high processing ability by using a plurality of decoders lower in processing performance. For example, it is possible to provide, at low cost, a decoding apparatus capable of (i) directly receiving digitally encoded video signals in DTV (Digital Television) broadcasting, and (ii) performing real time decoding processing by using decoders that are low in price and have low processing ability.

Also, the image decoding apparatus may further comprise a processing ability acquisition unit operable to acquire information pieces each indicating processing ability of a corresponding one of the decoders, wherein the determination unit may determine which of the decoders is caused to decode which of the plurality of pieces of partial data based further on the acquired information pieces each indicating the processing ability of the corresponding one of the decoders.

This allows the determination unit to determine which decoder is caused to decode which piece of partial data of image data based on performance of each decoder, making it possible to make decoding processing more efficient.

Also, even if a decoder is newly added or deleted, decoders that are caused to decode pieces of partial data is selected based on latest information on each decoder when determining which decoder is caused to decode which piece of partial data composing image data. Therefore, even if a decoder is newly added to or deleted from an apparatus that has already been configured, the current processing performance can be exhibited in the apparatus.

The technology of the patent document 1 has an advantage of making it possible to decrease the number of input and output pins even when four decoders are configured as an LSI. This is because the four decoders share a bus, and use frame memories outside the LSI. However, a structure for configuring the decoders in such way needs to be created in the LSI. Therefore, there is a disadvantage that image data cannot be easily expanded. For example, when a decoding apparatus for HDTV is realized using decoders for SDTV, it is not easy to set an image size to a size of the 4K standard.

The present invention performs decoding processing based on an attribute of image data and processing ability of a decoder, basically without requiring a special structure. Therefore, when, for example, a decoding apparatus for HDTV is realized using decoders for SDTV, an extension or the like that makes the decoding apparatus a decoding apparatus for a screen size of the 4K standard can be performed easily by simply adding the required number of decoders.

Also, the image decoding apparatus may further comprise a correspondence storage unit operable to store correspondence information in which identifiers indicating the determined decoders are in correspondence with identifiers of the plurality of pieces of partial data to be decoded by the determined decoders, wherein the attribute information piece on each of the plurality of pieces of partial data may indicate whether or not the corresponding one of the plurality of pieces of partial data needs to be decoded with reference to a decoding result of another piece of the partial data, the determination unit may determine which of the decoders decodes a piece of the partial data whose corresponding attribute information piece indicates that the piece of the partial data needs to be decoded with reference to the decoding result of the another piece of the partial data, the determined one or more of the decoders being higher in processing ability than another one of the decoders which is caused to decode the another piece of the partial data, and the decoding unit may (i) acquire, when any of the plurality of pieces of partial data needs to be decoded with reference to the decoding result of the another piece of the partial data, an output result of the another one of the decoders whose identifier is in correspondence with an identifier of the another piece of the partial data in the correspondence information, and (ii) cause each of the decoders to decode one or more corresponding pieces of the partial data.

Since information about which of the decoders decodes which piece of the partial data of image data in is stored in such way, it is possible to acquire a necessary image from another decoder, and to perform decoding processing when an image that has been decoded by the another decoder is needed for performing decoding.

Also, since it is determined that a decoder having high processing ability decodes partial data that needs the image which has been decoded by the another decoder in order to perform decoding, it is possible to adjust the amount of time the decoder takes to perform decoding processing so as to be equal to the amount of time another decoder takes to perform decoding processing.

Also, the decoding unit may cause, before causing the determined one of the decoders to decode the piece of the partial data whose corresponding attribute information piece indicates that the piece of the partial data needs to be decoded with reference to the decoding result of the another piece of the partial data, the another one of the decoders to decode the another piece of the partial data.

In such way, another piece of partial data is decoded before decoding is performed on partial data that needs a decoded image of another piece of partial data for being decoded. Therefore, it is possible to acquire an image of another piece of partial data when necessary. As a result, it is possible to perform decoding rapidly without stopping the decoding processing.

Also, the attribute information piece on each of the plurality of pieces of partial data may indicate the data amount of the corresponding one of the plurality of pieces of partial data, the information pieces each indicating the processing ability of the corresponding one of the decoders may show a bandwidth of data inputted by each of the decoders, and the determination unit may determine which of the decoders decodes a piece of the partial data whose data amount indicated by the attribute information piece is larger than a data amount of the another piece of the partial data, the determined one or more of the decoders each having a bandwidth broader than the another one of the decoders that is caused to decode the another piece of the partial data.

In such way, decoding processing is performed on partial data having a large data amount by a decoder having high computing ability or a computing unit having a broad data bandwidth. Therefore, it is possible to adjust the amount of time a decoder takes to perform decoding processing on even partial data having a large data amount so as to be equal to the amount of time another decoder takes to perform decoding processing.

Also, each of the plurality of pieces of partial data may be part of a bitstream which is the image data, and may be a bit string composing a picture.

Also, each of the plurality of pieces of partial data may be part of a bitstream which is the image data, and may be a bit string composing part of a picture.

In such way, each partial data composing image data can be a picture or partial data smaller than a picture. Therefore, it is possible to decode partial data having an optimal size by a decoder in accordance with a method used to compress and encode the image data.

The partial data smaller than a picture is a slice, a macroblock or the like, for example.

BRIEF DESCRIPTION OF THE DRAWINGS

FIG. 5 shows a structure and a content example of performance information 2100;

FIG. 6 shows a structure and a content example of allocation information 5100;

FIG. 7 shows a structure and a content example of allocation data 3100 and the like;

FIG. 13 shows a structure and a content example of attribute information 6100;

FIG. 14 shows a structure and a content example of attribute information 6200;

FIG. 19 shows a structure and a content example of allocation information 5200.

DESCRIPTION OF NUMERAL REFERENCES 10, 20, 30 image decoding apparatus
1000 attribute information detection unit
1100 attribute information
2000 allocation determination unit
2100 performance information
2200 5100 allocation information
2300 performance information acquisition unit
3000 allocation data generation unit
4000 4001 4002 4003 image decoding unit
4100 data reception unit
4200 reference image acquisition unit
4300 decoder
4400 reference image transmission unit
5000 5001 5002 5003 image storage unit
5200 encoded data
5300 decoded data
8000 allocation data storage unit
9000 image composition unit

DETAILED DESCRIPTION OF THE INVENTION

First Embodiment

Outline

The image decoding apparatus pertaining to the present invention reduces vacant time of each decoder, and causes the decoders to perform efficient decoding processing by dividing a bitstream (hereinafter, "image data") of encoded images into predetermined units (e.g. units of slices), and distributing the units of slices to the decoders according to a characteristic of each slice.

Also, the present image decoding apparatus can respond to changes in the number of decoders by acquiring processing performance of each decoder at appropriate timings, and also can perform decoding processing more efficiently by distributing slices based on processing ability of each decoder.

The following describes an image decoding apparatus in an embodiment of the present invention using the drawings.

Note that the embodiment describes the case where image data created according to the MPEG-2 standard is decoded.

Functions

Figure 1:
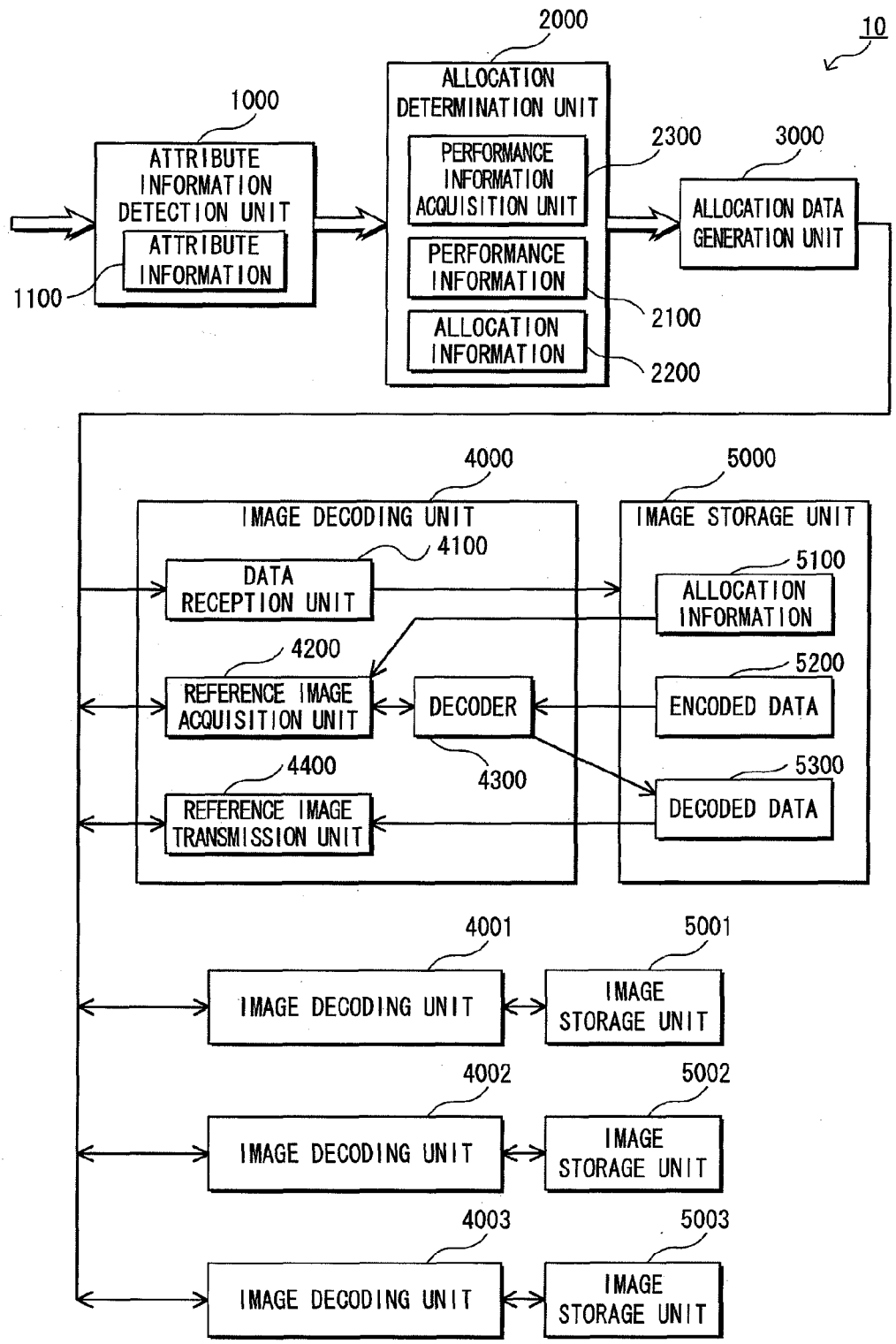
FIG. 1 is a block diagram showing a structure of an image decoding apparatus of a first embodiment.

FIG. 1 is a block diagram showing a structure of an image decoding apparatus of a first embodiment.

An image decoding apparatus 10 is composed of an attribute information detection unit 1000, an allocation determination unit 2000, an allocation data generation unit 3000, image decoding units (4000, 4001, 4002 and 4003) and image storage units (5000, 5001, 5002 and 5003). Note that although a description is given of the case where the image decoding apparatus 10 includes four image decoding units in the present embodiment, the number of image decoding units is not limited to this.

Firstly, the attribute information detection unit 1000 has a function of detecting an attribute of each slice composing image data which is variable-length coded image data having been inputted. Each image data is indicated by an outline arrow.

An attribute is characteristic information such as the data amount and a picture type of each slice, motion compensation information (intra-screen prediction, forward prediction, backward prediction and bidirectional prediction) or the like. The attribute information detection unit 1000 performs, depending on an attribute to acquire, variable-length decoding on image data, and acquires an attribute. In the present embodiment, a data amount that can be acquired without needing variable-length decoding is used as an attribute.

The attribute information detection unit 1000 basically outputs inputted image data as it is.

Figure 2:
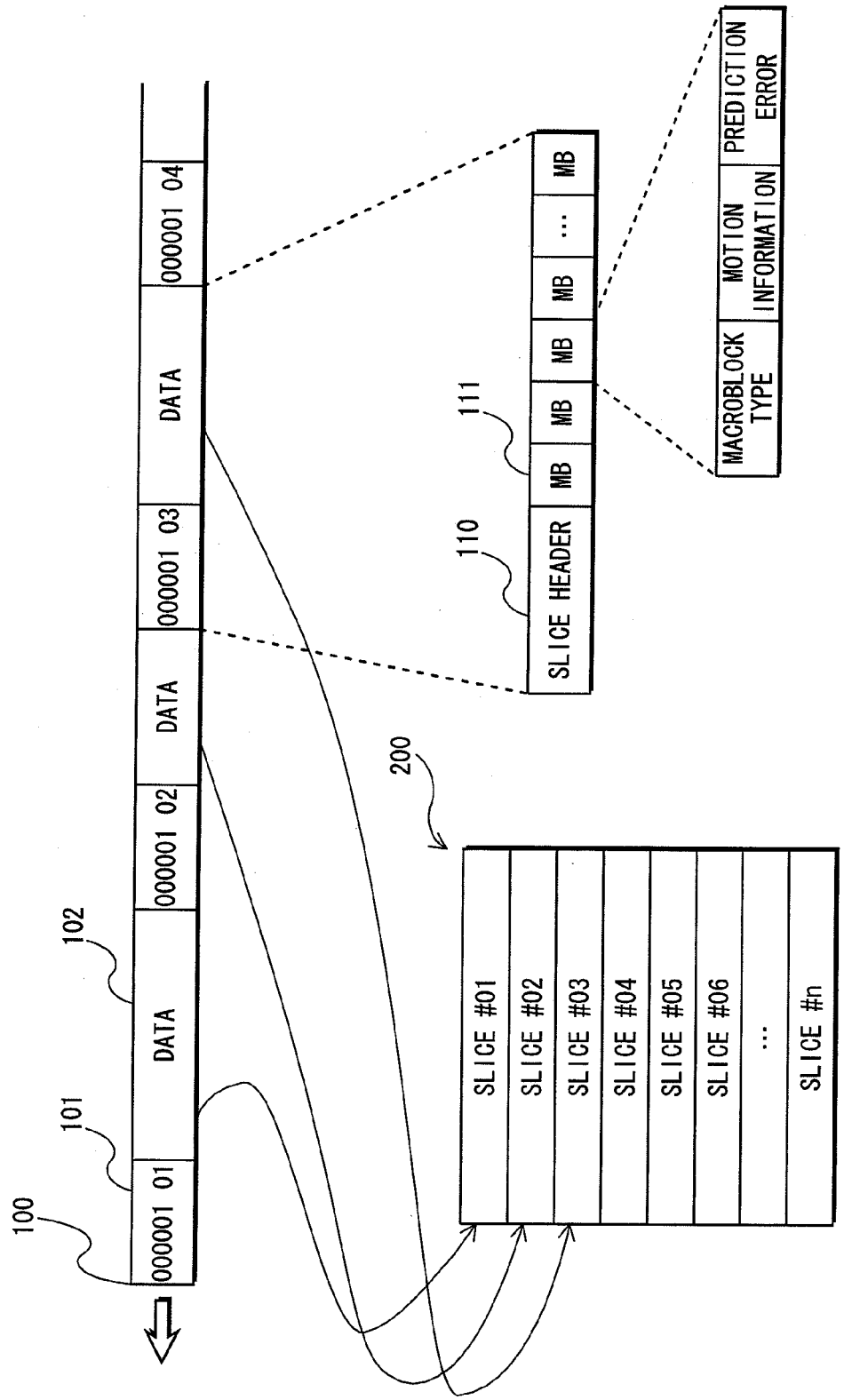
FIG. 2 shows the relationship between image data and slices.

Here, a description is given of image data and slices using FIG. 2.

FIG. 2 shows the relationship between image data and slices.

A picture 200 that corresponds to a screen frame is composed of a slice 01 to a slice n. Image data 100 is composed of a start code 101 indicating a first slice, and data 102 which is data obtained by compressing and encoding images of the slices.

The start code 101 is composed of 32 bits which are composed of a value 000001 (23 zeros followed by 1) in hexadecimal and 8 bits that follow the value. This "8 bits" indicates a kind of data that follows the start code.

Data in the MPEG-2 standard has a hierarchical structure composed of 6 layers: a video sequence layer, a GOP layer, a picture layer, a slice layer, a macroblock layer and a block layer which are arranged in this order stating from the highest layer. Layers that can be identified by detecting start codes are the sequence layer, the GOP layer, the picture layer and the slice layer. An allocation determination unit 2000 described in the following allocates image data to each of the image decoding units (4000 and the like) in units of sequences, units of GOPs, units of pictures or units of slices.

Slices are detected in the present embodiment. Accordingly, "000001 01" to "000001 af" are start codes, and "01" to "af" are slice numbers.

Each of the slices is composed of a slice header 110 starting from a start code and a plurality of macroblocks (MBs) 111, and the slice header includes a slice type. This slice type indicates whether a slice is an I slice, a B slice or a P slice. Here, the I slice is a slice that can be decoded using only information in the slice itself, and the P slice and the B slice are slices that can be decoded by referring to images of other slices.

A macroblock 111 is composed of a macroblock type and data corresponding to the macroblock type (e.g. motion information and inter-screen prediction error data). The macroblock type indicates information such as whether or not it is necessary to refer to an image of another slice for the present macroblock, and whether the macroblock is a unidirectional reference or a bidirectional reference.

The attribute information detection unit 1000 repeatedly detects the start codes 101 from the image data 100, and stores, as attribute information piece on each slice in the image data 100, a data amount information showing how much data exists between the start code 101 and the next start code.

The detected slice attribute is sent to the allocation determination unit 2000 as attribute information 1100. Specifically, the detected slice attribute is stored in a work memory (not shown) in the image decoding apparatus 10, and is referred to by the allocation determination unit 2000. In the present figure, attribute information 1100 is illustrated, for convenience, in the attribute information detection unit 1000 that detects attribute information. The same applies to performance information 2100 and allocation information 2200 which are described in the following.

Next, the allocation determination unit 2000 has a function of determining which image decoding unit (4000 or the like) is caused to perform decoding processing on each slice composing the image data 100 (i.e. allocation of slices).

This allocation determination unit 2000 includes a performance information acquisition unit 2300, and has functions of acquiring processing performance of each of the image decoding units (4000 and the like) at appropriate timings, and storing the acquired processing performance as the performance information 2100. This performance information acquisition unit 2300 has functions of detecting the number of image decoding units (4000 and the like) provided in the present image decoding apparatus 10, and acquiring each processing performance.

The allocation determination unit 2000 determines (i) allocation of each slice based on the attribute information 1100 detected by the attribute information detection unit 1000 and this performance information 2100, and (ii) creates the allocation information 2200. The detail of each of the attribute information 1100, the performance information 2100 and the allocation information 2200 is described later using FIG. 4 to FIG. 6.

Note that this allocation determination unit 2000 includes a buffering unit storing plural slices worth of image data 100 in order to determine a plurality of slice allocations.

Next, the allocation data generation unit 3000 has functions of reading image data stored in a memory of the allocation determination unit 2000 in accordance with allocation determined by the allocation determination unit 2000, and generating and outputting allocation data to be transmitted to each of the image decoding units (4000 and the like).

The allocation data is an allocated slice worth of image data, information necessary for decoding and the like. The allocation data generation unit 3000 analyses the image data received from the allocation determination unit 2000, and reads information necessary for decoding. The detail is explained later using FIG. 7.

Each of the image decoding units (4000, 4001, 4002 and 4003) has a normal decoding function, and an additional function of performing processing unique to the present image decoding apparatus 10 (e.g. processing such as acquisition of a necessary image from another image decoding unit).

Although there may be a difference in processing performance such as computing performance between image decoding units (4000 and the like) in some cases, each of the image decoding units (4000 and the like) has the same function of performing processing unique to the present image decoding apparatus 10.

Also, each of the image storage units (5000, 5001, 5002 and 5003) has a function of storing each kind of data for each of the decoding units (4000, 4001, 4002 and 4003) to perform decoding processing. Although there may be a difference in capacity such as computing performance between image decoding units (4000 and the like) in some cases, each of the image storage unit has the same function of storing data unique to the present image decoding apparatus 10 (e.g. data and the like indicating which slice is being decoded in which image decoding unit).

Accordingly, the following describes only the image decoding unit 4000 and the image storage unit 5000.

Firstly, the image storage unit 5000 is described.

The image storage unit 5000 stores allocation information 5100, encoded data 5200 and decoded data 5300.

The allocation information 5100 is information that indicates which slice is allocated to which image decoding unit. When it is necessary to refer to an image decoded by another image decoding unit (4001 or the like), this information is referred to when a request is made to the another image decoding unit (4001 or the like) for transmitting an image to be referred to (hereinafter, "reference image"). Furthermore, this information is referred to for determining in which image storage unit (5000 or the like) in an imaging decoding unit (4001 or the like) an image to be displayed is stored at the time of displaying the decoded image.

Although this allocation information 5100 is basically the same as the allocation information 2200 that is created by the allocation determination unit 2000, the number of pieces of allocation information stored is different. That is, once the allocation data has been created, the allocation information 2200 becomes unnecessary and is updated. However, necessary pieces of allocation information 5100 are stored for a necessary period of time since the allocation information 5100 refers to or is referred to by other image decoding units (4001 and the like).

The pieces of information necessary for referring are pieces of allocation information on slices including reference images which are possibly referred to. The necessary period of time is a period of time until the allocation information becomes free from the possibility of being referred to (i.e. until decoded images of the slices are displayed).

The encoded data 5200 is image data of slices allocated to the image decoding unit 4000 and information necessary for decoding.

The decoded data 5300 is image data decoded in the image decoding unit 4000.

This decoded data 5300 is stored until images in the decoded data 5300 are displayed. That is, the decoded data 5300 is stored until a picture including the images in the decoded data 5300 is displayed.

Note that although the present embodiment is described, taking the case where the image data encoded according to the MPEG-2 standard is decoded as an example, the decoded data 5300 is stored, in the case of image data encoded according to H.264/AVC, for example, until the images in the decoded data are displayed and no longer referred to. This is because the images are referred to even after being displayed in some cases.

Next, the image decoding unit 4000 is composed of a data reception unit 4100, a reference image acquisition unit 4200, a decoder 4300 and a reference image transmission unit 4400.

Firstly, the data reception unit 4100 has functions of receiving allocation data transmitted from the allocation data generation unit 3000 (i.e. image data of slices or the like to perform decoding on), and having the image storage unit 5000 store therein the image data and the like. The allocation data 5100 and the encoded data 5200 are stored.

The reference image acquisition unit 4200 has functions of making a request to another image decoding unit (4001 or the like) for transmitting a reference image, and acquiring the reference image when it is necessary to refer to another slice or another picture at the time of decoding slices.

The decoder 4300 has functions of reading and decoding the encoded data 5200 in the image storage unit 5000, and writing slices that have been decoded (hereinafter, "decoded slices") in the decoded data 5300.

The reference image transmission unit 4400 has functions of reading, when receiving a request for transmitting the reference image from another image decoding unit (4001 or the like), an image corresponding to the reference image from the decoded data 5300 in the image storage unit 5000, and transmitting the image to the another image decoding unit that has made the request.

Figure 3:
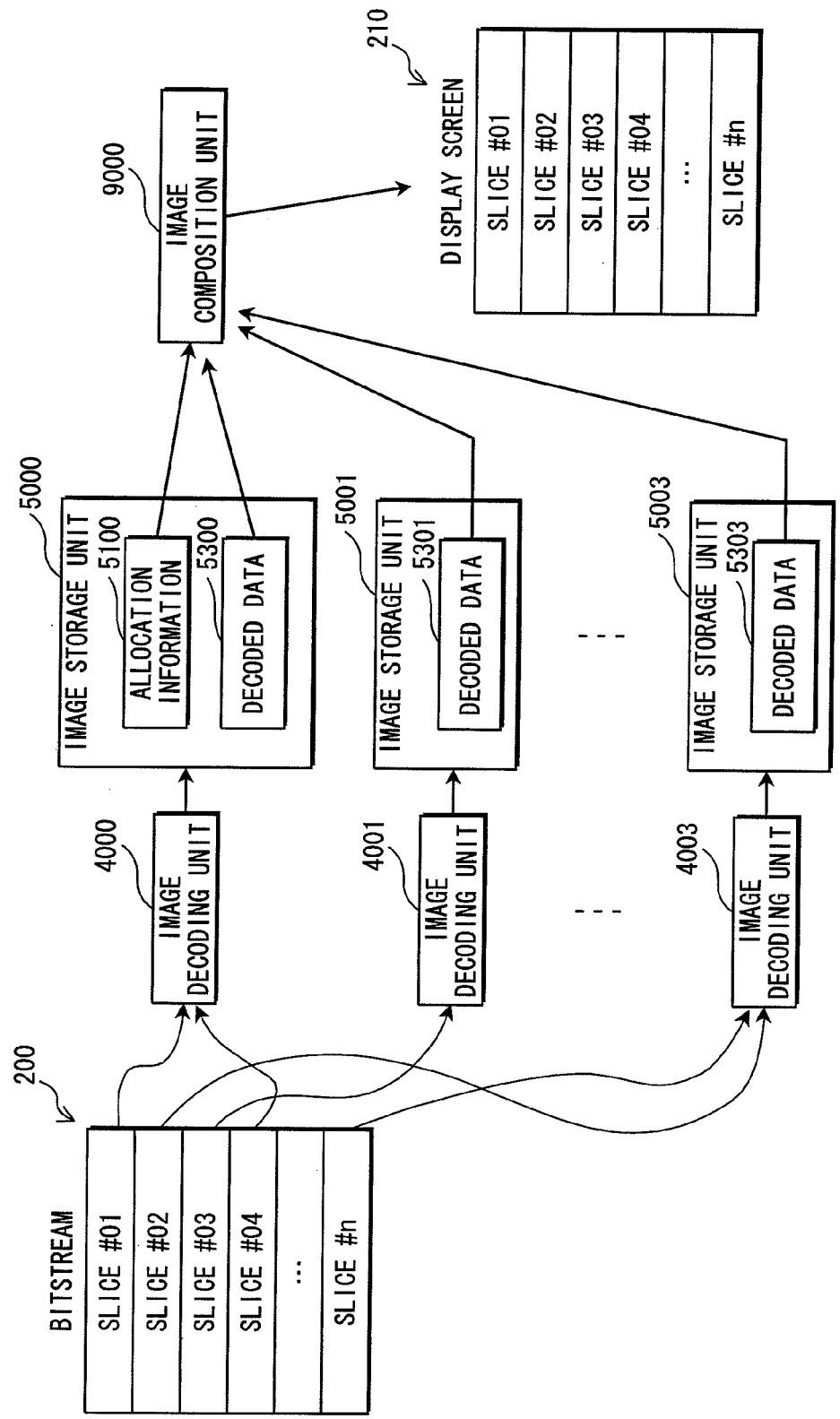
FIG. 3 is an overview showing that a picture is decoded and displayed using an image decoding apparatus 10.

Next, a brief description is given of a method of displaying slices decoded in a plurality of image decoding units (4000 and the like) using FIG. 3.

FIG. 3 is an overview showing that a picture is decoded and displayed using an image decoding apparatus 10.

A description is given of the case of decoding image data (bitstream) which is the picture 200 that has been compressed and encoded, and displaying the decoded image data as a picture 210 (display screen). An image composition unit 9000 has functions of reading the decoded slices from the image storage units (5000 and the like), recomposing the slices into a picture and displaying the picture.

Firstly, each slice composing the picture 200 is allocated to the image decoding units (4000, 4001 and the like), and is decoded. Each of the decoded slices is stored in decoded data (5300, 5301 or the like) in the image storage unit (5000 or the like).

The image composition unit 9000 refers to the allocation information 5100, reads the slices in order from a slice 01 from the decoded data (5300, 5301 and the like) in the image storing unit (5000, 5001 and the like) in which the relevant slices are stored.

In the image composition unit 9000, timing of displaying a picture is time corresponding to a frame rate.

Note that although the allocation information 5100 in the image storage unit 5000 is referred to in the present figure, allocation information in another image storage unit (5001 or the like), of course, may be referred to. Also, the image composition unit 9000 may acquire allocation information from the allocation determination unit 2000, and store the allocation information in the work memory.

Data

The following describes main data used in the present image decoding apparatus 10 using FIGS. 4 to 8.

Figure 4:
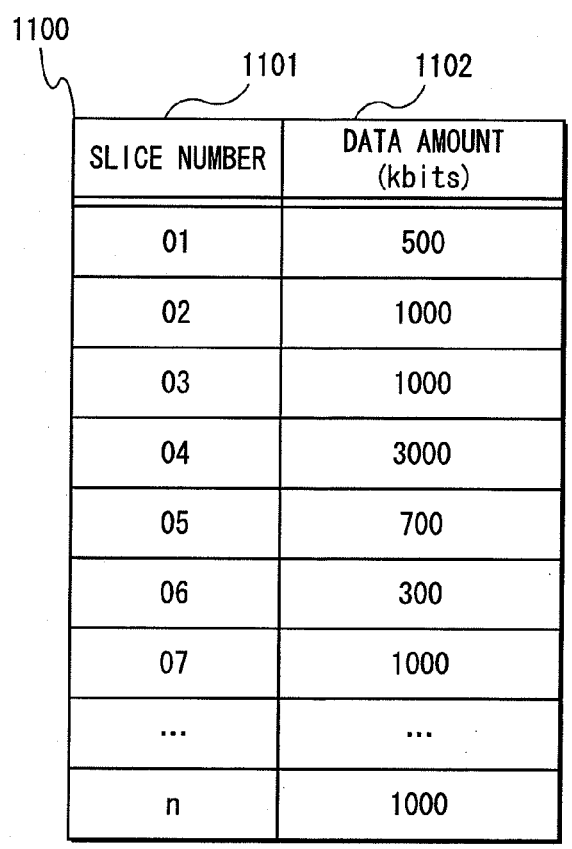
FIG. 4 shows a structure and a content example of attribute information 1100.

FIG. 4 shows a structure and a content example of attribute information 1100.

The attribute information 1100 is composed of a slice number 1101 and a data amount 1102.

The slice number 1101 is an identifier of each slice, and is a slice number in a start code (see FIG. 2) in the present embodiment.

The data amount 1102 is a data amount of each slice, and is detected by an attribute information detection unit 1000.

In a method of calculating the data amount, the data amount is, for example, calculated using the difference between an address of a start code (see FIG. 2) of a slice and an address of a start code of the next slice. Specifically, the data amount (unit: bit) of the slice is a value obtained by multiplying such difference between these addresses by 8 (bits). This is because start codes of slices are usually aligned in 8-bit units.

For example, a data amount of a slice which is indicated by a slice number 1001 "01" is "500" kbits.

FIG. 5 shows a structure and a content example of performance information 2100.

The performance information 2100 is composed of an image decoding unit ID 2101, a computing ability 2101 and a data bandwidth 2103.

The image decoding unit ID 2101 is an identifier of the image decoding unit (4000 or the like). "Dec00", "Dec01", "Dec02" and "Dec03" indicate an image decoding unit 4000, an image decoding unit 4001, an image decoding unit 4002 and an image decoding unit 4003, respectively.

The computing ability 2102 indicates computing ability of each of the image decoding units (4000 and the like) shown by the image decoding unit ID 2101, "SDTV" indicates computing ability capable of accurately decoding and displaying compressed and encoded data having an SDTV image size in real time, and "HDTV" indicates a computing ability capable of accurately decoding and displaying compressed and encoded data having a size up to an HDTV image size in real time.

Here, a brief description is given of the relationship between coding standards and the "SDTV" or the like. These standards are collections of some different standards, and each of these standards is defined by profiles and levels. A profile indicates a different degree of complexity when an image is digitally encoded. That is, the profile defines sets of encoded element technology to be used, and a level indicates a different resolution of each image. For example, the Main Profile@Main Level of the MPEG-2 is intended for encoding a video signal of an SDTV image size. Also, Main Profile@High Level is intended for encoding a video signal of an HDTV image size.

Next, the data bandwidth 2103 indicates an input data bandwidth of each of the image decoding units (4000 and the like) indicated by the image decoding unit ID 2101.

For example, the image decoding unit 4002 indicated as an image decoding unit ID 2101 "Dec02" has the computing ability 2102 of an "HDTV", and the data bandwidth 2103 of "80" Mbps.

FIG. 6 shows a structure and a content example of the allocation information 5100.

Since the allocation information 2200 has the same structure as the allocation information 5100, only the allocation information 5100 is described.

The allocation information 5100 is composed of an image decoding unit ID 5101 and an allocation slice number 5102.

The image decoding unit ID 5101 is the same as the image decoding unit ID 2101 of the performance information 2100.

The allocation slice number 5102 indicates the number of a slice to be allocated to an image decoding unit indicated by a corresponding image decoding unit ID 5101. The slice number indicated here is the same as the slice number 1101 of the attribute information 1100.

For example, since an allocation slice number 5102 that corresponds to an image decoding unit ID 5101 "Dec00" is "01", and the data amount 1102 of a slice of a slice number 1101 "01" of the attribute information 1100 is "500" kbits, a slice whose data amount is 500 kbits is allocated to an image decoding unit of the image decoding unit ID 5101 "Dec01".

Note that although up to two allocation slice numbers are allocated to each of the image decoding units, the number of allocation slice numbers is not limited to this.

Figure 7:
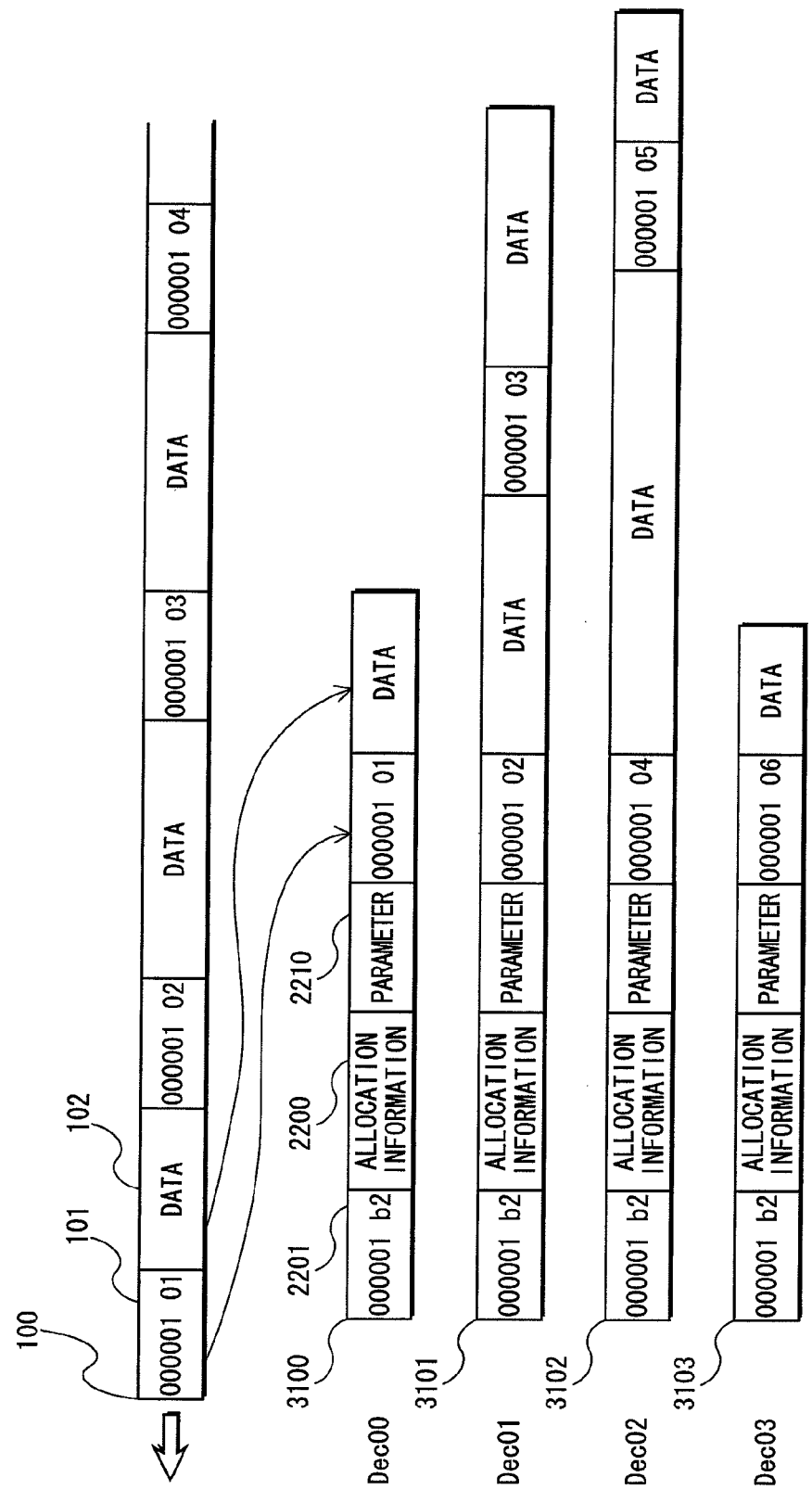

FIG. 7 shows a structure and a content example of allocation data 3100 and the like.

This allocation data (3100, 3101, 3102 or 3103) is data generated by the allocation data generation unit 3000 for each of the image decoding units (4000, 4001, 4002 and 4003).

This allocation data (3100 or the like) is data in which the allocation information 2200 and information 2210 necessary for decoding (recited as "parameter" in FIG. 7) are added to slice data that has been allocated.

Specifically, the allocation information 2200 and the information (parameter) 2210 necessary for decoding are added before the start code 101 of a first slice which has been allocated. In this case, a start code 2201 "000001 b2" indicating user data is added before the allocation information 2200 or the like.

This information (parameter) necessary for decoding is information extracted by the allocation data generation unit 3000 (see FIG. 1) by analyzing image data. Specifically, such information is information except for slice data to be transferred to each of the image decoding units (4000 and the like), and is information (e.g. a frame size, frame rate and the like that are included in a sequence header, a GOP header or the like positioned in a layer higher than slices) necessary when each of the image decoding units (4000 and the like) decodes slices.

In such way, each of the image decoding units (4000 and the like) is notified of the allocated slice data and the allocation information 2200. Therefore, it is possible to acquire a reference image by referring to this allocation information 2200.

Here, a description is given of one method of allocating slices to each of the image decoding units.
Method of Creating Allocation Information FIG. 8 shows a time chart in which image decoding units (4000 and the like) decode slices.

Figure 8:
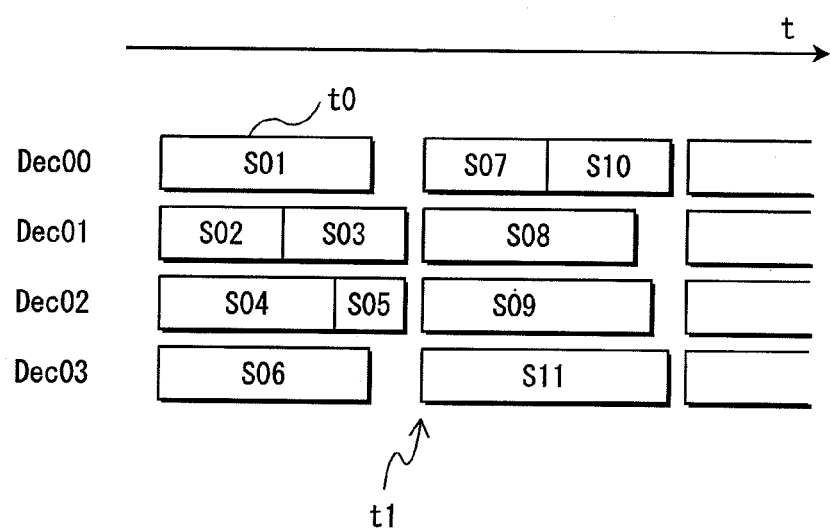
FIG. 8 shows a time chart in which image decoding units (4000 and the like) decode slices.

In FIG. 8, "S01" indicates a slice whose slice number is "01", and the same applies to "S02" and the like. "Dec00" to "Dec03" are image decoding unit IDs.

In parallel with decoding (t0) performed on a slice 01 by the Dec00, a Dec01 decodes a slice 02 and a slice 03, a Dec02 decodes a slice 04 and a slice 05, and the Dec 03 decodes a slice 06.

When each of the image decoding units Dec00 to Dec03 finishes decoding allocated slice(s), the allocation data generation unit 3000 transmits the next allocation data, and each of the image decoding units Dec00 to Dec03 starts decoding slices from a slice 07 to a slice 11 (t1).

In the present embodiment, slices are allocated so as to keep minimum vacant time between the completion of decoding processing of each of the image decoding units Dec00 to Dec03 and the start of the next decoding processing.

In general, the larger the data amount of each slice unit is, the higher processing load of each slice is. Therefore, it is necessary to perform the decoding processing in an image decoding unit having a high processing ability.

Also, it is necessary to determine a data bandwidth in accordance with the data amount of a slice to be allocated in order to provide each of the image decoding units with allocation data so as not to prevent the decoding processing in each of the image decoding units. That is, as the data amount of the slice to be allocated becomes large, it is necessary to allocate the slice to an image decoding unit whose data bandwidth capable of receiving image data is broad.

Thus, it is possible to perform processing of each slice composing a picture at high speed by allocating a slice to each of the image decoding units based on processing performance of each of the image decoding units and a data amount of each slice. This makes it possible to finish processing all of the slices composing a picture within one frame time, making it possible to perform real time processing.
Operations The following describes operations of the image decoding apparatus 10 pertaining to the present invention using FIG. 9 and FIG. 10.

Figure 9:
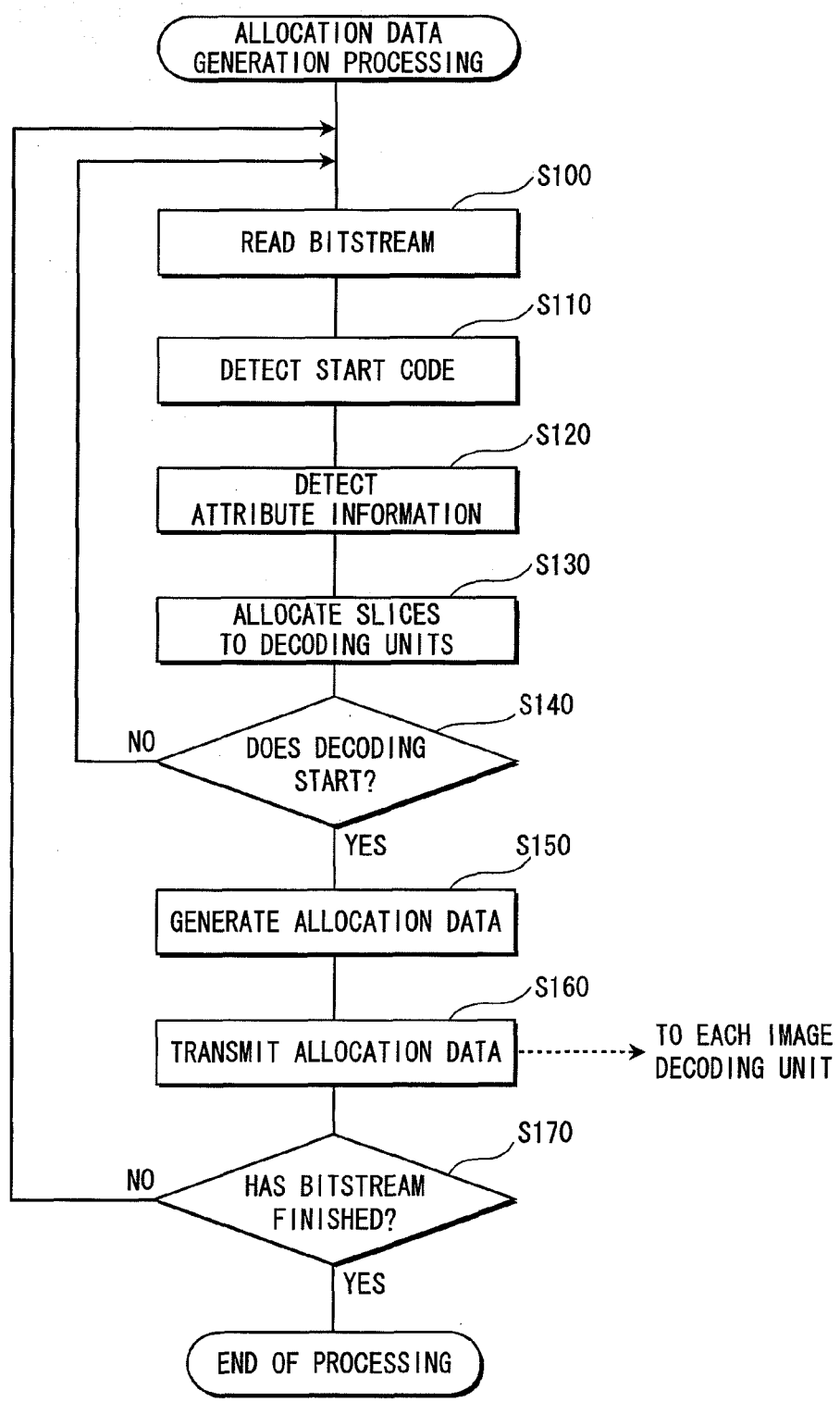
FIG. 9 is a flowchart showing processing of generating allocation data.
Figure 10:
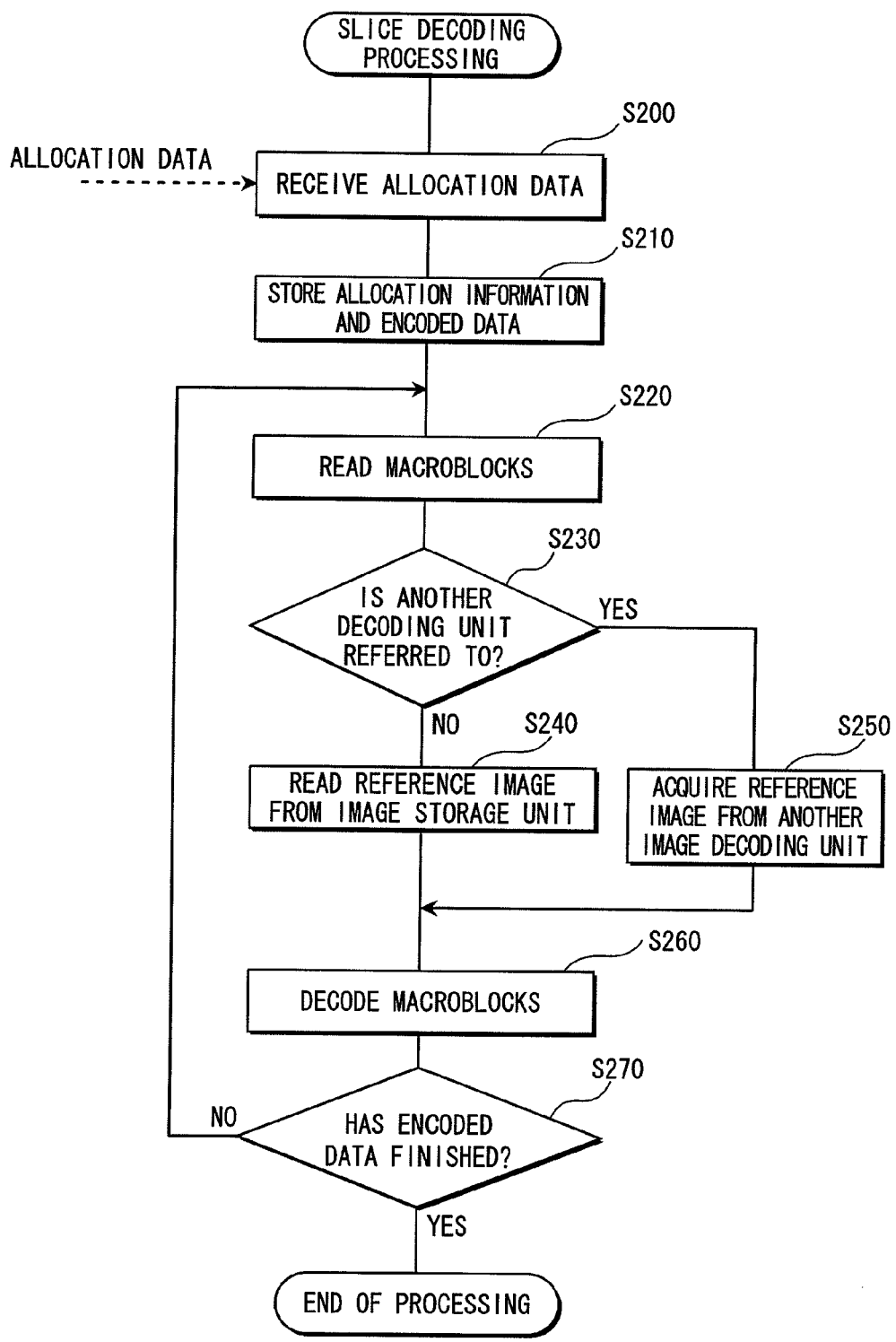
FIG. 10 is a flowchart showing decoding processing performed on a slice by an image decoding unit.

FIG. 9 is a flowchart showing processing of generating allocation data, and FIG. 10 is a flowchart showing decoding processing performed on a slice by an image decoding unit on a slice.

This processing of generating allocation data and this processing of decoding a slice are performed in parallel. That is, the next allocation data is created while a slice is decoded.

Firstly, the processing of generating allocation data is described using FIG. 9.

Each of the attribute information detection unit 1000, the allocation determination unit 2000 and the allocation data generation unit 3000 performs such processing.

The attribute information detection unit 1000 that has read a bitstream which is image data (Step S100) detects a start code (Step S110).

After detecting the start code, the attribute information detection unit 1000 reads a slice number, skips image data until detecting the next start code, and detects the data amount of a slice. Then the attribute information detection unit 1000 registers the slice number and the data amount in the attribute information 1100 (Step S120).

The attribute information detection unit 1000 that has detected the attribute information transmits the read image data as it is to the allocation determination unit 2000. The allocation determination unit 2000 determines which image decoding unit a slice in the read image data is allocated to (Step S130).

After the determination, the allocation determination unit 2000 determines whether to cause the image decoding unit to start decoding processing or not. In the case of determining negatively, the allocation determination unit 2000 further reads image data (Step S140: No).

In the case of determining to start decoding (Step S140: Yes), the allocation determination unit 2000 makes a request to the allocation data generation unit 3000 for creating allocation data in accordance with the allocation information 2200.

Here, as to the determination of whether to cause the image decoding unit to start decoding processing or not, the allocation determination unit 2000 determines to cause the image decoding unit to start decoding processing when, for example, a buffering unit storing therein image data included in the allocation determination unit 2000 overflows, and all of the image decoding units (4000 and the like) complete decoding processing.

Receiving an allocation data generation request, the allocation data generation unit 3000 refers to the allocation information 2200, reads image data stored in a memory of the allocation determination unit 2000, and generates image data to transmit to each of the image decoding units (4000 and the like) (Step S150). The allocation data that has been generated is transmitted to each of the image decoding units (4000, 4001 and the like) (Step S160).

The allocation data generation unit 3000 finishes processing when no more image data exists (Step S170: Yes), and continues processing of generating allocation data when image data exists (Step S170: No).

Next, a description is given of processing of decoding slices using FIG. 10.

This processing is performed by each of the image decoding units (4000, 4001 and the like). Here, operations of the image decoding unit 4000 are described. Other image decoding units (4001 and the like) perform the same processing in parallel.

Receiving the allocation data 3100 (see FIG. 7) (Step S200), the data reception unit 4100 extracts the allocation information 2200 from the received allocation data 3100, stores the allocation information 2200 in the allocation information 5100 in the image storage unit 5000, and stores slice data in the encoded data 5200 (Step S210). Storing the allocation information 2200 and the slice data, the data reception unit 4100 makes a request to the decoder 4300 for starting decoding.

Receiving the request, the decoder 4300 reads macroblocks in a slice to decode (hereinafter, "target macroblocks") from the encoded data 5200 in order (Step S220), and starts decoding.

The decoder 4300 determines, when decoding the target macroblocks, whether or not it is necessary to refer to macroblocks in a slice decoded in another image decoding unit (4001 or the like), that is, whether or not to refer to another image decoding unit.

The decoder 4300 determines whether or not to refer to another image decoding unit by referring to the allocation information 5100 stored in the image storage unit 5000 based on a type of each of the target macroblocks, and a slice to refer to.

Specifically, the decoder 4300 determines to refer to another image decoding unit when (i) the type of each of the target macroblocks is a type showing that it is necessary to refer to an image of another slice, and (ii) the another slice is allocated to another image decoding unit (4001 or the like). Accordingly, even when the type of each of the target macroblocks is the type showing that it is necessary to refer to the image of another slice, the decoder 4300 determines not to refer to another image decoding unit in some cases. Also, even when the type of each of the target macroblocks shows that in-screen reference encoding has been performed, the decoder 4300 determines not to refer to another image decoding unit.

In the case of determining to refer to another image decoding unit (Step S230: Yes), the decoder 4300 makes a request to the reference image acquisition unit 4200 for acquiring decoded data of a macroblock to be referred to (hereinafter, "reference macroblock"). In this case, the decoder 4300 designates information (e.g. a picture number, a motion vector or the like) by which the reference macroblock can be specified.

Receiving the request for acquiring the reference macroblock, the reference image acquisition unit 4200 refers to the allocation information 5100 stored in the image storage unit 5000, and obtains the image decoding unit ID 5101 of an image decoding unit that has performed decoding on the reference macroblock. The reference image acquisition unit 4200 makes a request to the image decoding unit of the obtained image decoding unit ID 5101 for transmitting data of the reference macroblock, and acquires the data of the reference macroblock (Step S250).

Also, when it is not necessary to refer to a macroblock in another slice (Step S230: No), the reference image acquisition unit 4200 reads the data of the reference macroblock from the decoded data 5300 in the image storage unit 5000 (Step S240).

The decoder 4300 decodes the target macroblocks using the acquired data of the reference macroblock and the like, and writes the data which has been decoded in the decoded data 5300 (Step S260).

The decoder 4300 performs such decoding processing on macroblocks until the allocated slices are complete (Step S270). After the completion, the decoder 4300 notifies the allocation determination unit 2000 of the completion.

Second Embodiment

Outline

In the first embodiment, allocation to each of the image decoding units is performed in units of slices based on the data amount of each slice. However, the present embodiment describes an example of performing allocation to each of the image decoding units in units of pictures based on a type of each picture (I, P, B). Of course, allocation may be performed in units of slices based on a type of each slice. However, a description is given of the case of performing allocation in units of pictures for convenience.

Pictures in the MPEG-2 standards have the following three types.

The three types of pictures are I-picture on which in-screen prediction is performed, P-picture on which forward prediction is performed from a past picture, and B-picture on which bidirectional prediction is performed from the past picture and a future picture.

Function

A structure of an image decoding apparatus of the present embodiment is the same as the structure of the image decoding apparatus of the first embodiment.

The differences between the structure of the image decoding apparatus of the present embodiment and the structure of the image decoding apparatus of the first embodiment are that the image decoding apparatus of the present embodiment operates so as to perform decoding in units of pictures, and that the attribute information detection unit 1000 detects a picture attribute instead of detecting the slice attribute.

Although the data amount of each slice is obtained as a slice attribute in the first embodiment, a picture type is obtained as a picture attribute in the present embodiment.

Also, along with this, the allocation determination unit 2000 allocates a picture to each of the image decoding units (4000 and the like) in accordance with a picture type.

Figure 11:
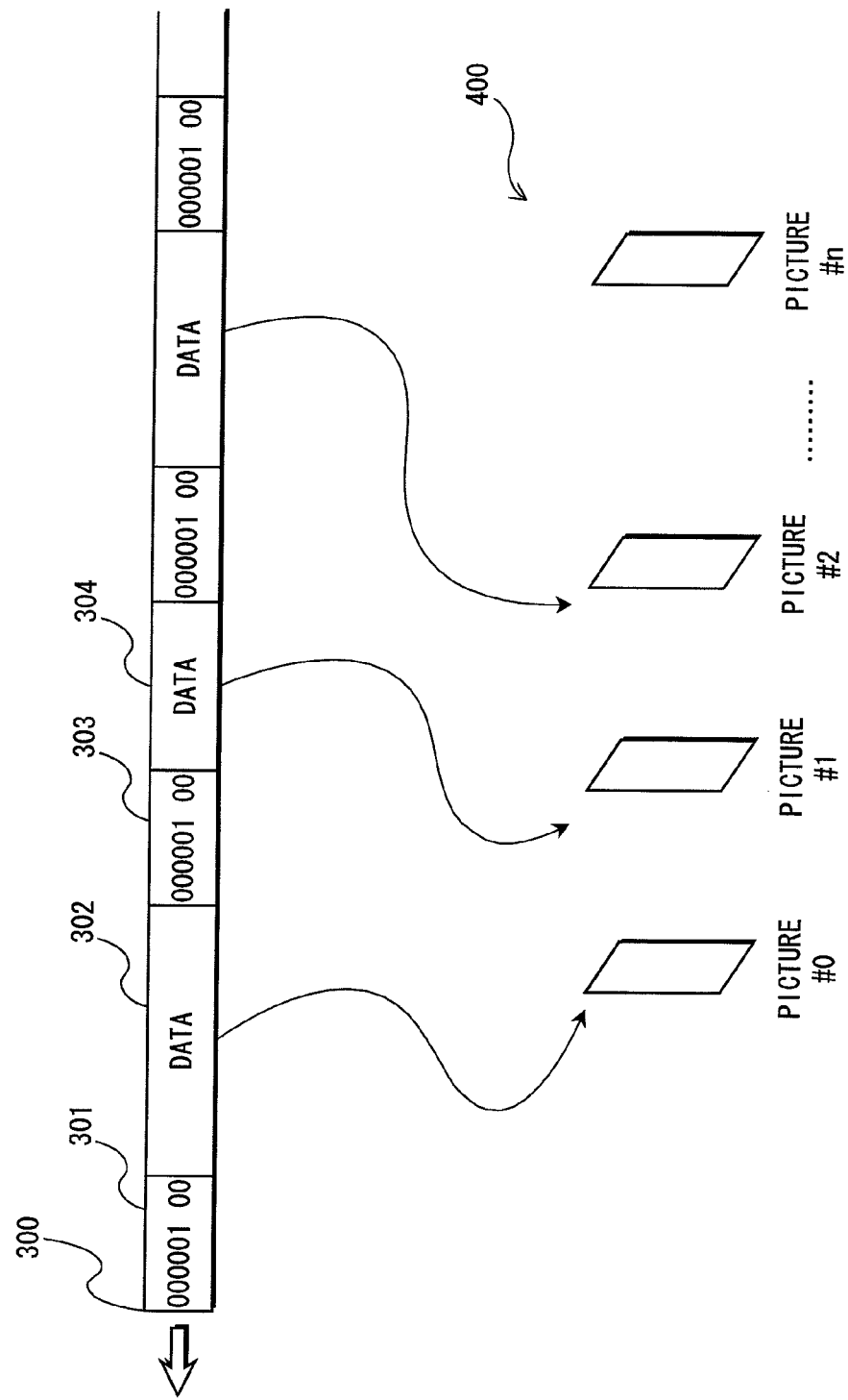
FIG. 11 shows the relationship between image data and pictures.

FIG. 11 shows the relationship between image data and a picture.

A start code 301 is composed of 32 bits which are composed of a value "000001 (23 zeros followed by 1)" in hexadecimal and data of "00" that follows the value.

The attribute information detection unit 1000 repeatedly (i) detects the start code 301 from image data 300, (ii) reads a picture type from a picture header (not shown), (iii) stores the read picture type and a reference picture as attribute information of the picture, and (iv) reads until the next start code. Data 302 between the start code 301 and a next start code 303 is image data of one picture.

Data

The following describes attribute information 6100 and the allocation information 2200 of the present embodiment using FIG. 12 to FIG. 15.

Figure 12:
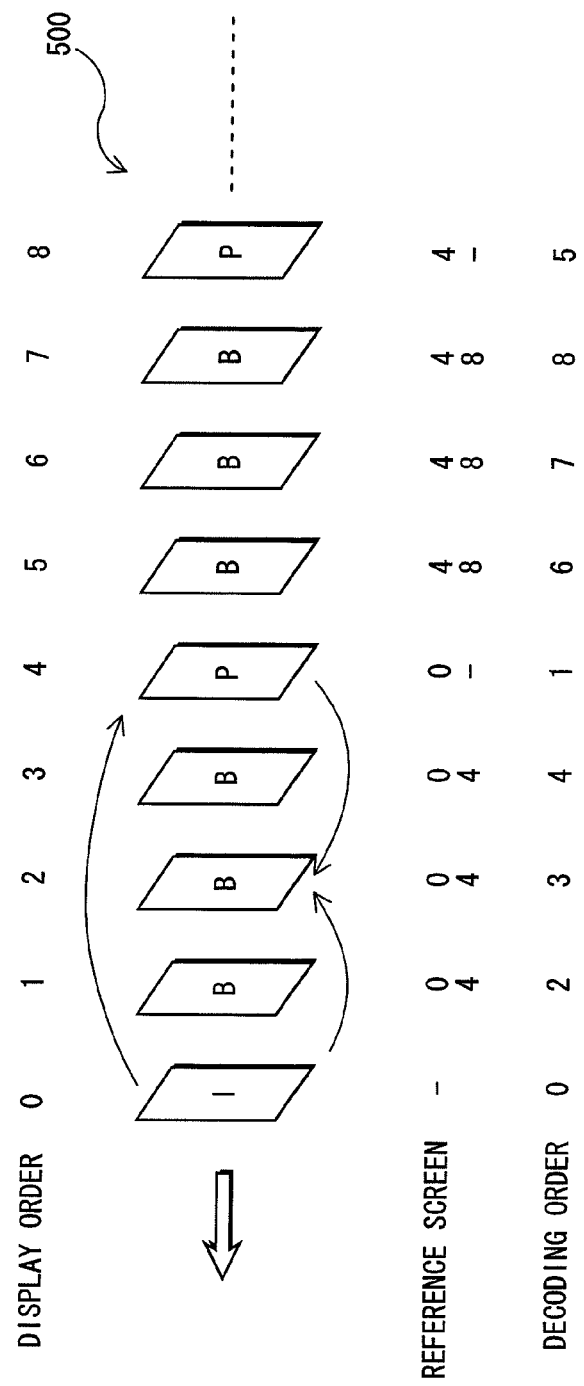
FIG. 12 shows the relationship between a picture type, display order, reference screen and decoding order.

Firstly, a description is given of the relationship between a picture type, display order, reference screen and decoding order using FIG. 12.

Each rectangle indicates a picture, and each of "I", "B" and "P" in each of the rectangles indicate I type, B type and P type, respectively.

"Display order" indicates an order of displaying pictures, and is called a picture number in the present explanation.

"Reference screen" indicates a picture number which each picture refers to, and "decoding order" indicates an order of decoding pictures.

For example, a picture whose "display order" is "4" has a "reference screen" of "0". That is, a type of the picture is a P-type that refers to a picture whose picture number is "0". Also, "decoding order" of the picture is "1". That is, the picture is a second picture to be decoded.

FIG. 13 shows a structure and a content example of the attribute information 6100. This attribute information 6100 is in place of the attribute information 1100 in the first embodiment.

The attribute information 6100 includes a decoding order 6101, a picture number 6102, a picture type 6103 and a reference picture 6104.

The decoding order 6101 indicates an order of pictures to be decoded.

The picture number 6102 indicates an identifier of each picture, and is a display number of each picture.

The picture type 6103 indicates a type of each picture, and "I", "B" and "P" indicate "I type", "B type" and "P type", respectively.

Also, the reference picture 6104 indicates a picture number of a picture which a corresponding picture refers to. That is, if such reference picture is not decoded, the corresponding picture will not be decoded accurately.

For example, a picture whose decoding order 6101 is "0" (i.e. a picture to be decoded first) has a picture number 6102 of "0", and has a picture type 6103 of "I". That is, a type of the picture is I picture that can be decoded only by the intra-screen prediction. Since the picture is I picture, the picture does not have a reference picture 6103.

Next, FIG. 14 shows a structure and a content example of attribute information 6200. This allocation information 6200 is in place of the allocation information 2200 in the first embodiment.

The allocation information 6200 includes the decoding order 6101 and an image decoding unit 6201.

The decoding order 6101 is the same as the decoding order 6101 of the attribute information 6100. Also, the image decoding unit 6201 is an identifier of each image decoding unit. "Dec00", "Dec01", "Dec02" and "Dec03" indicate an image decoding unit 4000, an image decoding unit 4001, an image decoding unit 4002 and an image decoding unit 4003, respectively.

For example, a picture whose decoding order 6101 is "0" is decoded by the "Dec00" and the "Dec03".

The following describes one method of allocating a picture to each image decoding unit.

Method of Creating Allocation Information

Figure 15:
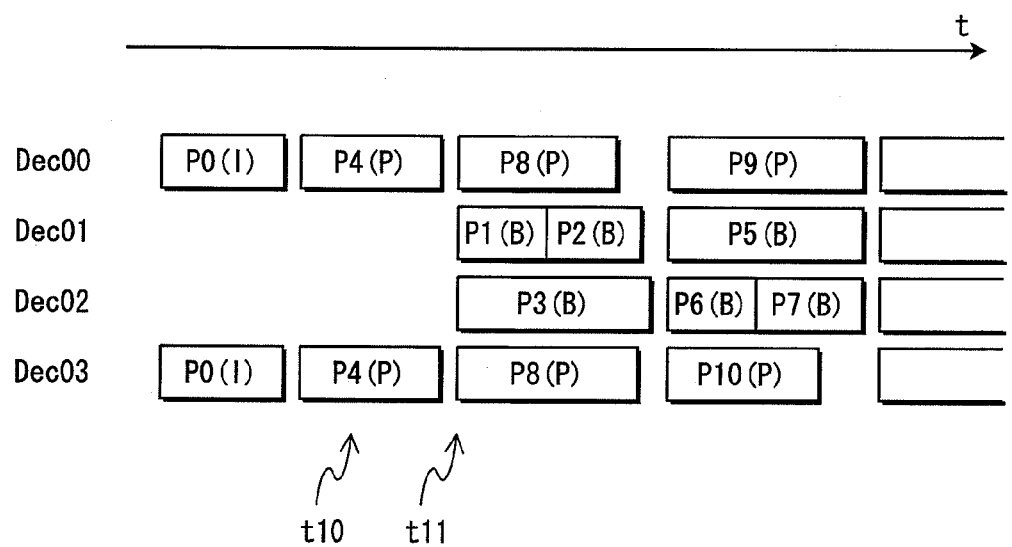
FIG. 15 shows a time chart in which the image decoding units decode pictures.

FIG. 15 shows a time chart in which the image decoding units decode pictures.

FIG. 15 shows that "P0(I)" is a picture whose picture number is "0", and is an I picture. The same applies to "P2 (B)" and the like. The "Dec00" to the "Dec03" are image decoding unit IDs.

A time chart of the present figure shows a case when decoding processing is performed according to the allocation information 6200 shown in FIG. 14. Firstly, a picture 0 (decoding order "0") is decoded by the Dec00 and the Dec03. Next, a picture 4 (decoding order "1") is decoded. Each slice of the picture 0 and the picture 4 is allocated to the Dec00 and the Dec03, and is decoded.

After that, a picture 1 (decoding order "2") and a picture 2 (decoding order "3") are decoded by the Dec01, a picture 3 (decoding order "4") is decoded by Dec02, and a picture 8 (decoding order "5") is decoded by the Dec00 and the Dec03.

Here, an example of a basic idea of allocation is described.

Here, two elements need to be considered. One is a picture type, and the other is a reference picture.

Firstly, a picture having many reference images to read is allocated to an image decoding unit having a broad data bandwidth. Pictures having the largest number of images to be read are a B-picture, a P-picture and an I-picture. Therefore, each picture is allocated to an image decoding unit having a broadest data bandwidth in this order.

Next, since the B picture can be decoded only after the I picture or the P picture to be a reference picture is decoded, a picture number "4" which is a reference picture of the picture number "1" is decoded first (see t10). At this time, since no other pictures can be decoded, a picture is not allocated to the Dec01 or the Dec02. After that, a picture whose picture number is "1" is decoded (see t11).

In such way, the allocation determination unit 2000 (i) determines the decoding order of pictures and an image decoding unit to allocate a picture to, and (ii) creates the allocation information 6200 based on a picture type and a reference picture (see FIG. 14).

Operation

The operation of the image decoding unit of the present embodiment is the same as the operation of the image decoding unit of the first embodiment described using FIG. 9 and FIG. 10.

The differences between the operation of the image decoding unit of the present embodiment and the operation of the image decoding unit of the first embodiment are: that the image decoding unit of the present embodiment performs decoding in units of pictures; the attribute information 6100 (detected in Step S120) that accompanies such decoding; and the allocation information 6200 that is created in Step S130.

In the present embodiment, each of the image storage units (5000 and the like) stores therein a picture that has been decoded (hereinafter, "decoded picture") or part of the decoded picture. Therefore, the image composition unit 9000 (see FIG. 3) refers to the allocation information 6200, reads encoded pictures according to the displaying order, and composes the encoded pictures as necessary.

Third Embodiment

Figure 16:
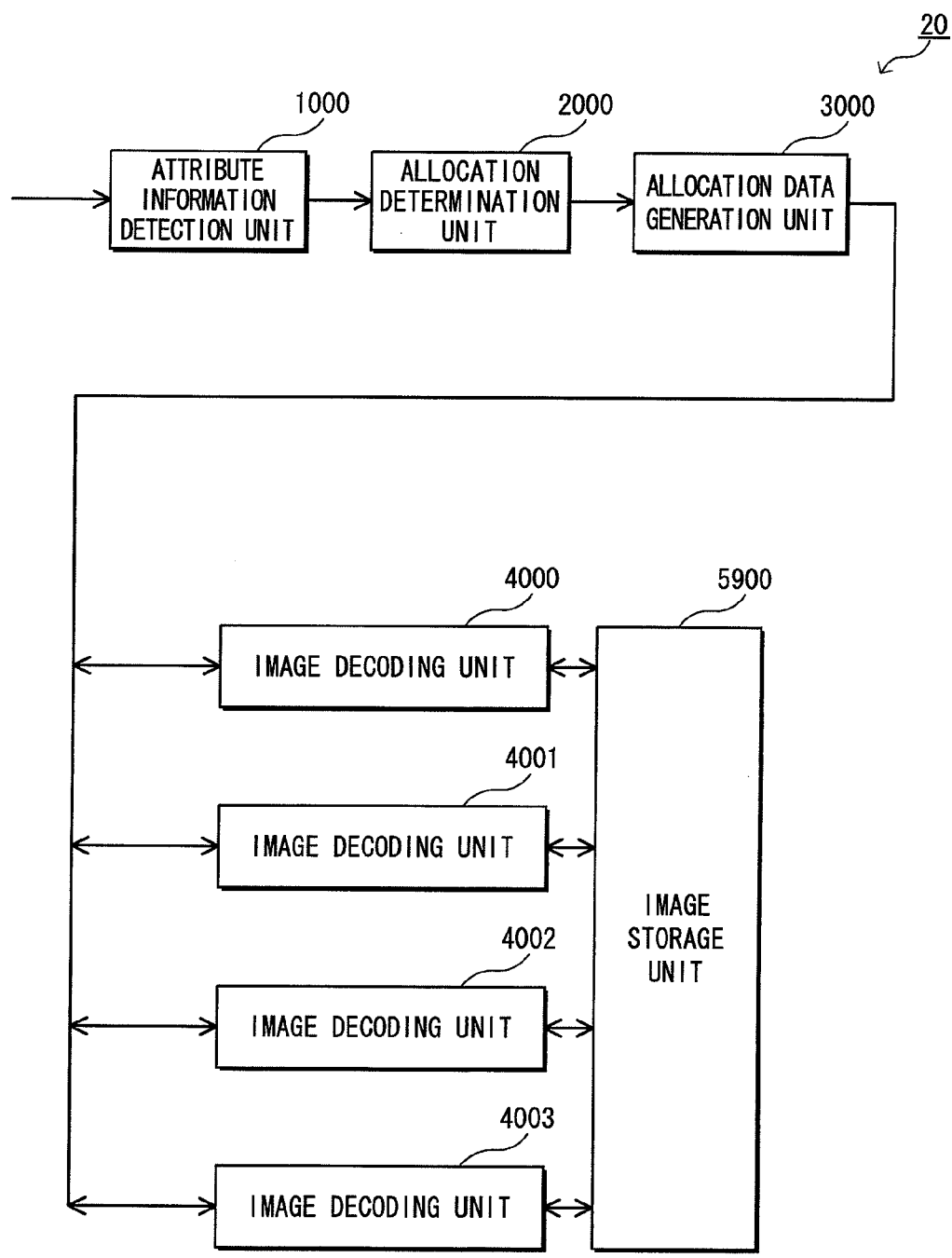
FIG. 16 is a block diagram showing a structure of an image decoding apparatus of a third embodiment.

FIG. 16 is a block diagram of an image decoding apparatus 20 of the present embodiment.

Although each of the image decoding units (4000, 4001, 4002 and 4003) includes each of the image storage units (5000, 5001, 5002 and 5003), respectively in the first embodiment, the present embodiment is different from the first embodiment only in that the image decoding units share one image storage unit 5900.

In the first embodiment, each of the image storage units (5000 and the like) stores therein the allocation information 5100, the encoded data 5200 and the decoded data 5300 (see FIG. 1).

In the present embodiment, a region is allocated to each of the image decoding units (4000 and the like) in the image storage unit 5900, and the image decoding units 4000 to 4003 share the decoded data 5300. Here, the region is for storing the allocation information 5100 and the encoded data 5200. Note that the image decoding units 4000 to 4003 may share the allocation information 5100.

Sharing the decoded data 5300 means, for example, providing each picture unit with a region for storing a decoded picture.

Each of the image decoding units (4000 and the like) refers to the allocation information 5100, and stores the result of decoding allocation data (3100 or the like) (i.e., a decoded slice which is the result of decoding an allocated slice) in a position of a corresponding slice in the decoded picture.

Each of the image decoding units (4000 and the like) writes a decoded slice of a slice which has been allocated to each of the image decoding units in each region of a decoded picture, which completes the decoded picture.

Also, when a reference image is necessary, each of the image decoding units reads, from each region of the decoded picture, and decodes a corresponding reference macroblock.

As to display, in the first embodiment, it is necessary to read, from each of the image storage units 5900, decoding results that should be displayed in a raster order of image frames. In the present embodiment, each encoded slice is written in each region which has been allocated so as to configure a picture. Accordingly, it is possible to display the image frames by transmitting the decoding results to units that display the decoding results in the raster order from a decoded picture. Therefore, there is an advantage that it is not necessary to compose a picture from slices.

Fourth Embodiment

Figure 17:
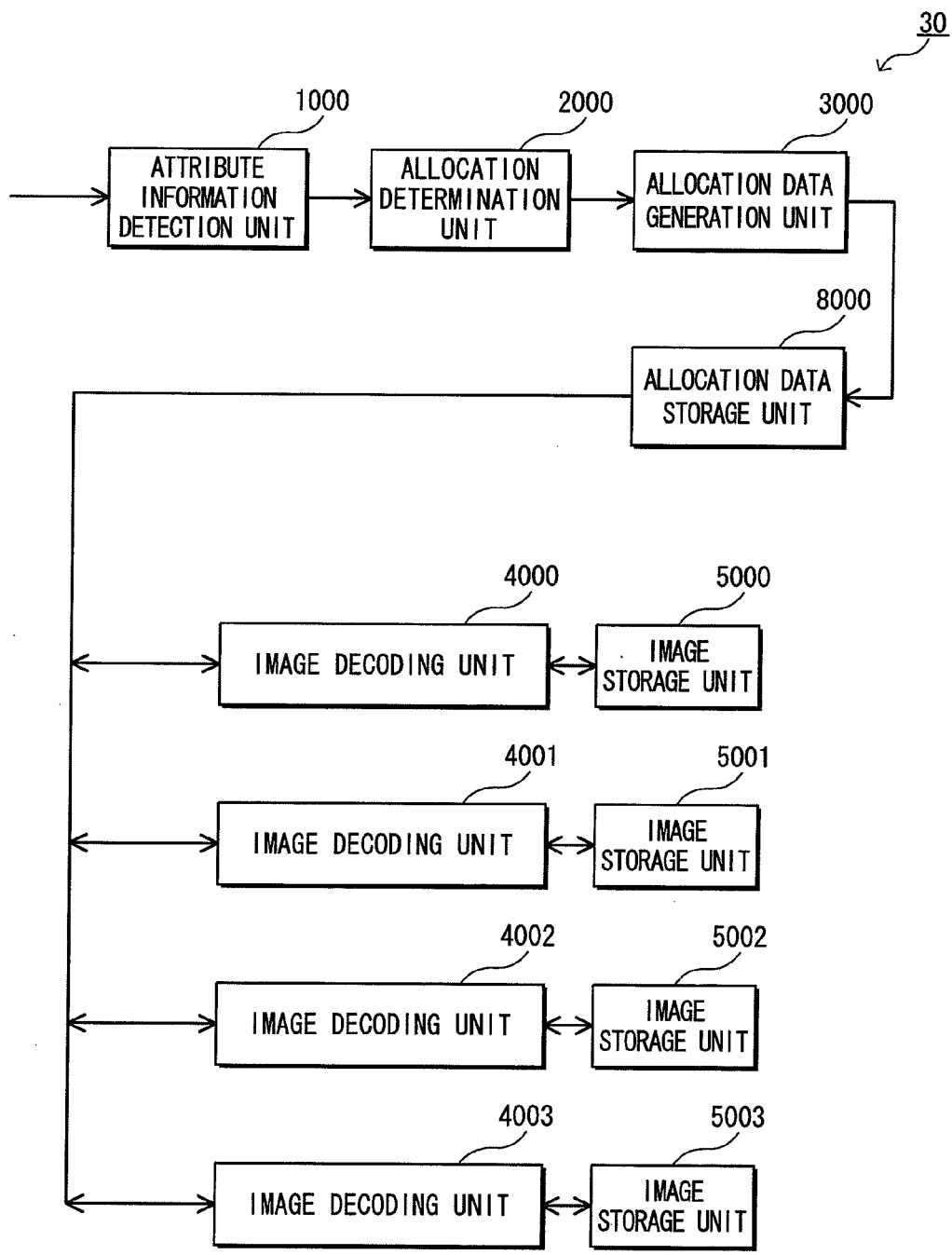
FIG. 17 is a block diagram showing a structure of an image decoding apparatus of a fourth embodiment.
Figure 18:
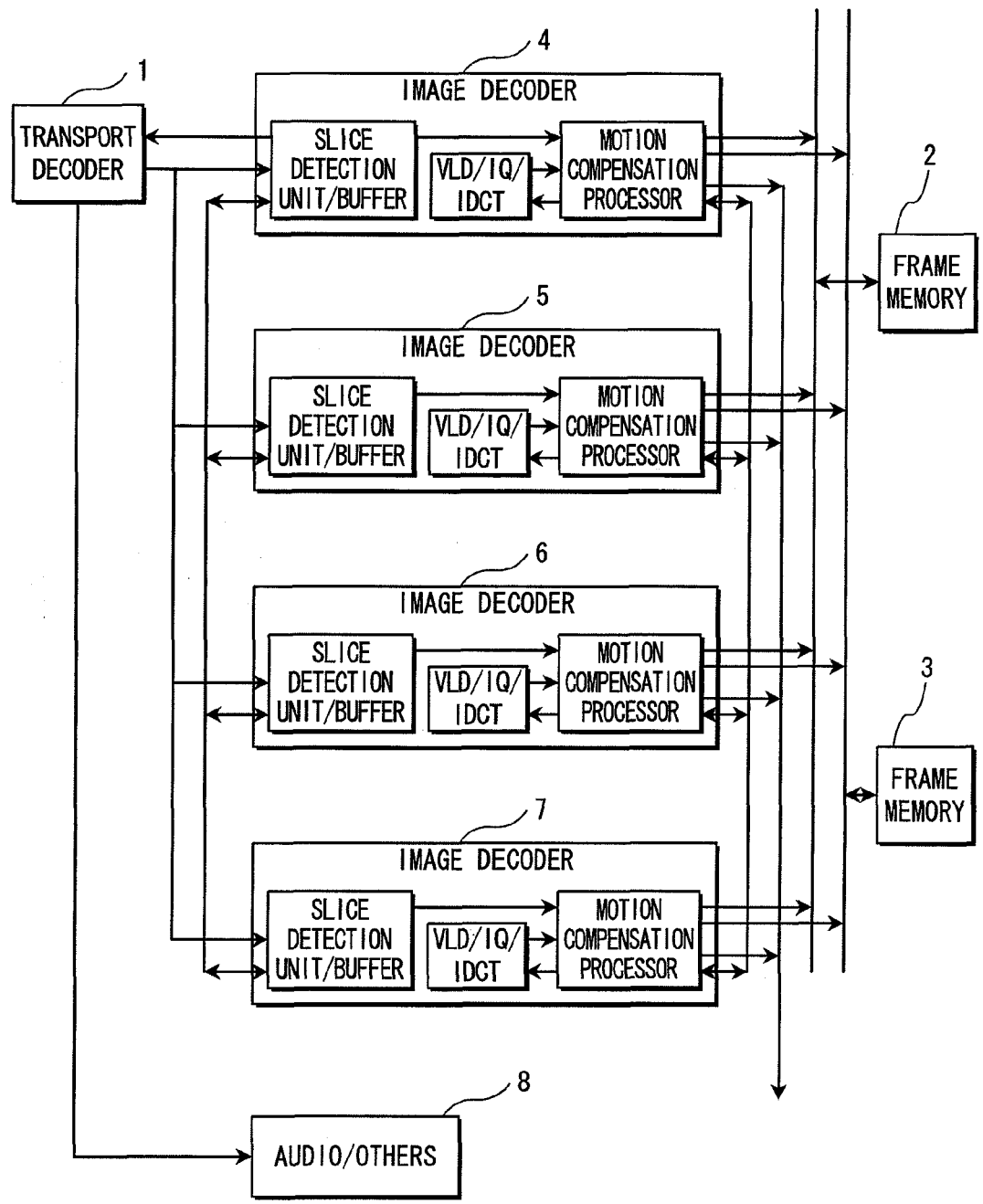
FIG. 18 is a block diagram showing a structure of a conventional image decoding apparatus.

FIG. 17 shows a block diagram of an image decoding apparatus 30 of the present embodiment.

Although the allocation data (3100 or the like) generated in the allocation data generation unit 3000 is transmitted to the image decoding unit (4000, 4001, 4002 or 4003) in the first embodiment, the present embodiment is different from the first embodiment in that the allocation data is stored in an allocation data storage unit 8000 first, and the allocation data is transmitted from the allocation data storage unit 8000 to each of the image decoding units (4000 and the like) in the present embodiment.

The allocation data storage unit 8000 is provided because generation processing by the allocation data generation unit 3000 for each of the image decoding units (4000 and the like) cannot be completed before the processing by the image decoding unit (4000 or the like) in some cases. When this happens, it is not possible to perform real-time image decoding processing.

The generation processing of the allocation data cannot be completed before the processing by the image decoding unit when, for example, a unit of allocation is smaller than a slice (i.e. when a unit consists of a plurality of macroblocks).

In a bitstream which has been encoded according to the usual MPEG-2 standards, a minimum unit of a segment that can be identified by a start code is a slice unit. However, it is possible to identify a segment of macroblocks which are units positioned lower than a slice layer by performing variable length decoding on bitstreams sequentially.

It is possible to divide a bitstream into units of a plurality of macroblock by adding, to each identified segment of macroblocks, a start code which is not preset according to the MPEG-2 standard.

In this case, it is necessary to perform variable-length decoding on the image data 100 sequentially in order to perform allocation in units of the plurality of macroblock, and it takes the same amount of time taken for a normal decoding operation to perform such decoding in order to avoid skipping image data in the attribute information detection unit 1000 like the first embodiment and the like.

Accordingly, the generation processing by the allocation data generation unit 3000 cannot be completed before the processing by the image decoding unit (4000 or the like) in some cases.

Therefore, it is possible to complete the decoding processing in the image decoding unit (4000 or the like) before displaying of a screen frame by (i) storing allocation data which has been generated in the allocation data generation unit 3000 in the allocation data storage unit 8000 and (ii) making processing performed by the allocation data generation unit 3000 unsynchronized with processing performed by the image decoding unit (4000 or the like).

At this time, it is possible to acquire motion compensation information such as a motion vector or the like, and to add the information to the allocation information as attribute information in a process of sequentially performing the variable length decoding.

The motion vector as this motion compensation information is referred to when a reference image is read from the image storage unit (5000 or the like).

Also, the present embodiment is effective even when real time processing cannot be performed in the image decoding unit (4000 or the like). Here, the real time processing cannot be performed in the image decoding unit (4000 or the like) because processing ability of each unit from the attribute information detection unit 1000 to the allocation data generation unit 3000 is low compared to the processing ability of the image decoding units (4000 and the like).

A description is given of one method of allocating image data to the plurality of image decoding units.

Method of Creating Allocation Information

Image data is allocated to each of the image decoding units (4000 and the like) such that each processing time for image data in each of the image decoding units (4000 and the like) is equal, and the processing time is short.

Specifically, allocation is determined based on the number of macroblocks in each image data (bitstream) to be decoded per unit time, and processing performance of each of the image decoding units (4000 and the like) (i.e. the number of macroblocks that can be processed per unit time).

Firstly, the number of macroblocks "l(el)" in image data per second is obtained.

The number of macroblocks "l" is obtained from a corresponding image frame size and a corresponding frame rate of image data. The frame size and the frame rate are acquired from header information.

The number of macroblocks to be decoded per second is "$l=s/16 \times t/16 \times u$", where a macroblock is "$16 \text{ pixels} \times 16 \text{ pixels}$", the frame size is "s(the number of horizontal pixels)×t (the number of vertical pixels)" and the frame rate is "u". The result of "/" is rounded up to the next integer.

For example, in the case of image data of the 4K standard of the digital cinema standard, the number of macroblocks to be decoded per second is "$l=256 \times 135 \times 24=829,440$", where an image frame size is 4096 pixels 2160 lines, and the frame rate is 24 frames per second.

Next, the number of macroblocks "Pi" of each of the image decoding units (4000 and the like) that can be processed per second is obtained. "i" is the number of image decoding units (4000 and the like) 1 to n that can be processed in parallel, and n is 4 in the present embodiment.

The number of macroblocks that can be decoded in a second is "$Pi=si/16 \times ti/16 \times ui$", where a corresponding image frame size defined as a specification of each image decoding unit is "si (the number of horizontal pixels)×ti(the number of vertical pixels), and a frame rate is "ui".

For example, the image decoding unit whose computing ability 2102 (see FIG. 5) of the performance information 2100 is "SDTV" has an SDTV image frame size of 720 pixels 480 lines, and a frame rate of 30 frames per second. Therefore, it is possible to process "Pi=45×30×30=40, 500" macroblocks per second.

Here, the case of performing decoding processing of image data of a single bitstream that exceeds the performance of a single image decoding unit is taken into account.

Since "1/Q<1", where the summation of processing performance "Pi" of each image decoding unit is "Q", it is presumed that a plurality of image decoding units can be ensured.

Next, macroblocks are allocated to image decoding units that have been ensured such that processing time is equal. The amount of image data to be allocated to each of the image decoding units is "mi". "i" is the number of image decoding units (4000 and the like) 1 to n that have been ensured.

Macroblocks are allocated to each of the image decoding units such that time for processing macroblocks allocated to each of the image decoding units (i.e. "mi/Pi") is as equal as possible.

By allocating macroblocks to each of the image decoding units in such way, it is possible to shorten idle time of each of the image decoding units, and to perform effective decoding processing.

In the present embodiment, processing ability is calculated using the number of macroblocks that can be decoded in a second. However, the calculation of processing ability is not limited to this.

Also, image decoding units to be ensured may be all of image decoding units or may be some of the image decoding units included in the image decoding apparatus. When some of the image decoding units are used, another image decoding unit which is not in use may be used to perform decoding processing of another piece of image data.

Note that an image decoding unit that is caused to decode may be determined based on the number of macroblocks composing each slice or the number of macroblocks composing each picture even in the case of allocating slices or pictures like other embodiments.

Supplementation

Although the embodiments of the present invention are described in the above, the present invention is not limited to the above-stated embodiments. The following is possible.

(1) Although the allocation information 5100 is stored in each of the image storage units (5000 and the like) in the embodiments, the allocation information 5100 may be stored in a memory in each of the image decoding units (4000 and the like).

When the allocation information 5100 is stored in a memory in each of the image decoding units (4000 and the like), there is an advantage that an access to the allocation information 5100 is accelerated.

(2) Although each of the embodiments shows a structure in which each allocation slice number 5102 is determined according to each image decoding unit ID 5101 in the allocation information 5100, the structure like the allocation information 5200 as shown in FIG. 19 is possible.

That is, each image decoding unit ID 5202 is determined according to each slice number 5201. With such structure, there are advantages that it is possible to eliminate the restriction on the number of slices to be allocated to each of the image decoding units, and to make allocation more flexible.

(3) Although information in a sequence header or a picture header that are necessary for decoding slices is sent to each of the image decoding units as allocation information in the embodiments, other methods may be used to notify each of the image decoding units.

For example, although only slice data that has been allocated is sent to each of the image decoding units together with the allocation information 2200 in the embodiments, whole image data (e.g. whole data from the start of the video sequence) may be sent to each of the image decoding units together with the allocation information 2200. In this case, each of the image decoding units extracts slice data allocated to each of the image decoding units from each whole image data, and stores the extracted slice data as the encoded data 5200. Since each of the image decoding units can refer to the sequence header and the picture header, it is possible to obtain information necessary for decoding.

Also, the attribute information detection unit 1000, the allocation determination unit 2000 and the allocation data generation unit 3000 that control decoding of an image may set, in each of the image decoding units, information necessary for each of the image decoding units not in the form of a stream.

(4) All of or some of each of the elements in FIG. 1 of the image decoding apparatus may be realized by an integrated circuit of one chip or a plurality of chips.

Each function unit except for the image storage units (5000 and the like) may be realized on a single semiconductor integrated circuit.

Also, the image decoding units (4000 and the like) may be realized by a single semiconductor integrated circuit, and the attribute information detection unit 1000, the allocation determination unit 2000 and the allocation data generation unit 3000 may be realized on a single semiconductor integrated circuit.

Also, each of the image decoding units (4000 and the like) may be realized by a different semiconductor integrated circuit. An amount of segment data or characteristic information detection unit 101, the attribute information detection unit 1000, the allocation determination unit 2000 and the allocation data generation unit 3000 may be realized on a single semiconductor integrated circuit.

(5) All of or some of each of the elements in FIG. 1 of the image decoding apparatus may be realized by a computer program or in any other form.

In the case of a computer program, the computer program may be executed by having a computer read the computer program written in any recording medium such as memory card, CD-ROM or the like, or may be executed by downloading a program via a network.

(6) The image decoding unit (4000 and the like) and the image storage unit (5000 and the like) may be realized by an individual system like a STB (Set Top Box) or a DVD recorder.

Also, the allocation data storage unit 8000 may be realized by a hard disk of a device including a hard disk such as a DVD recorder with a hard disk.

(7) Although the allocation in units of slices is determined based on a data amount, and the allocation in units of pictures is determined based on a picture type in the embodiments, it is possible to determine allocation based on the data amount, the type and the like by combining these attributes with other attributes except for these attributes.

(8) Although computing ability and data bandwidth are used as the performance information 2100 of each of the image decoding units in the embodiments, others may be used as the performance information 2100.

Also, although all of the usable image decoding units are used in the embodiments, it is possible to use only some of the usable image decoding units. Furthermore, bit streams of a plurality of pieces of image data may be decoded.

The present invention may be applied to an AV device that performs decoding processing of an image.

The invention claimed is:

1. An image decoding apparatus that decodes encoded image data composed of a plurality of pieces of partial data, the image decoding apparatus comprising:
   a plurality of decoders;
   an attribute information acquisition unit operable to acquire attribute information pieces each (i) affecting decoding processing time of a corresponding one of the plurality of pieces of partial data, and (ii) including at least a data amount of the corresponding one of the plurality of pieces of partial data;
   a processing ability acquisition unit operable to acquire, from each of the decoders, an information piece indicating a processing ability of a corresponding one of the decoders, the processing ability indicating a data amount that the decoder is able to process per unit time;
   a determination unit operable to determine which decoder decodes which of the plurality of pieces of partial data based on the acquired attribute information pieces on the plurality of pieces of partial data and the acquired information pieces indicating the processing ability of the corresponding one of the decoders; and
   a decoding unit operable to cause two or more of the decoders which have been determined in the determination unit to decode two or more corresponding pieces of the partial data in parallel,
   wherein the encoded image data corresponds to a single video stream,
   the decoders are capable of being changed such that a decoder not included in the decoders before the change is included in the decoders after the change and such that a decoder included in the decoders before the change is no longer included in the decoders after the change, and
   the processing ability acquisition unit acquires, from each of the decoders, the information piece indicating the processing ability of the corresponding one of the decoders when a total number of the decoders increases or decreases.

2. The image decoding apparatus of claim 1, wherein
   each of the plurality of pieces of partial data includes an identifier, and
   the image decoding apparatus further comprises:
   a correspondence storage unit operable to store correspondence information in which identifiers indicating the determined decoders are in correspondence with identifiers of the plurality of pieces of partial data to be decoded by the determined decoders, wherein
   the attribute information piece on each of the plurality of pieces of partial data indicates whether or not the corresponding one of the plurality of pieces of partial data needs to be decoded with reference to a decoding result of another piece of the partial data,
   the determination unit determines which of the decoders decodes a piece of the partial data whose corresponding attribute information piece indicates that the piece of the partial data needs to be decoded with reference to the decoding result of the another piece of the partial data, the determined one or more of the decoders being higher in processing ability than another one of the decoders which is caused to decode the another piece of the partial data, and
   the decoding unit (i) acquires, when any of the plurality of pieces of partial data needs to be decoded with reference to the decoding result of the another piece of the partial data, an output result of the another one of the decoders whose identifier is in correspondence with an identifier of the another piece of the partial data in the correspondence information, and (ii) causes each of the decoders to decode one or more corresponding pieces of the partial data.

3. The image decoding apparatus of claim 2, wherein
   the decoding unit causes, before causing the determined one of the decoders to decode the piece of the partial data whose corresponding attribute information piece indicates that the piece of the partial data needs to be decoded with reference to the decoding result of the another piece of the partial data, the another one of the decoders to decode the another piece of the partial data.

4. The image decoding apparatus of claim 3, wherein
   the attribute information piece on each of the plurality of pieces of partial data indicates the data amount of the corresponding one of the plurality of pieces of partial data,
   the information pieces each indicating the processing ability of the corresponding one of the decoders shows a bandwidth of data inputted by each of the decoders, and
   the determination unit determines which of the decoders decodes a piece of the partial data whose data amount indicated by the attribute information piece is larger than a data amount of the another piece of the partial data, the determined one or more of the decoders each having a bandwidth broader than the another one of the decoders that is caused to decode the another piece of the partial data.

5. The image decoding apparatus of claim 1, wherein
   each of the plurality of pieces of partial data is part of a bitstream which is the image data, and is a bit string composing a picture.

6. The image decoding apparatus of claim 1, wherein
   each of the plurality of pieces of partial data is part of a bitstream which is the image data, and is a bit string composing part of a picture.

7. An image decoding method that is used in an image decoding apparatus that includes a plurality of decoders and that decodes encoded image data composed of a plurality of pieces of partial data, the image decoding method comprising:
   an attribute information acquisition step of acquiring attribute information pieces each (i) affecting decoding processing time of a corresponding one of the plurality of pieces of partial data, and (ii) including at least a data amount of the corresponding one of the plurality of pieces of partial data;
   a processing ability acquisition step of acquiring, from each of the decoders, an information piece indicating a processing ability of a corresponding one of the decoders, the processing ability indicating a data amount that the decoder is able to process per unit time;
   a determination step of determining which decoder decodes which of the plurality of pieces of partial data based on the acquired attribute information pieces on the plurality of pieces of partial data and the acquired information pieces indicating the processing ability of the corresponding one of the decoders; and
   a decoding step of causing two or more of the decoders which have been determined in the determination step to decode two or more corresponding pieces of the partial data in parallel,
   wherein the encoded image data corresponds to a single video stream,
   the decoders are capable of being changed such that a decoder not included in the decoders before the change is included in the decoders after the change and such that a decoder included in the decoders before the change is no longer included in the decoders after the change, and the processing ability acquisition step acquires, from each of the decoders, the information piece indicating the processing ability of the corresponding one of the decoders when a total number of the decoders increases or decreases.

8. The image decoding apparatus of claim 1, wherein each of the plurality of pieces of partial data includes an identifier, and the image decoding apparatus further comprises:

a first correspondence storage unit operable to store correspondence information in which the identifiers of the plurality of pieces of the partial data are in correspondence with identifiers of the decoders; and an allocation data generation unit operable to generate, according to the determination made by the determination unit, allocation data for each of the determined decoders, and to output the allocation data for each of the determined decoders to the decoding unit, the allocation data for a given one of the determined decoders including one or more corresponding pieces of partial data to be decoded by the given one of the determined decoders, data required for the given one of the determined decoders to decode the one or more corresponding pieces of partial data, and the correspondence information, wherein the determination unit causes the first correspondence storage unit to store identifiers indicating the determined decoders in correspondence with identifiers of the plurality of pieces of partial data to be decoded by the determined decoders, each of the decoders includes a second correspondence storage unit, the second correspondence storage unit of a given decoder obtaining and storing the correspondence information included in the allocation data corresponding to the given decoder, and the decoding unit causes of the determined decoders to decode the plurality of pieces of partial data to be decoded by the determined decoders indicated by the corresponding identifiers stored in the correspondence storage unit.

9. The image decoding apparatus of claim 8, further comprising a generation unit operable to generate, from a plurality of decoded pieces of partial data obtained through the decoding by the determined decoders, decoded image data corresponding to the encoded image data, the generation of the decoded image data performed by using the correspondence between the identifiers of the plurality of pieces of the partial data to be decoded by the determined decoders and the identifiers of the determined decoders indicated by the correspondence information stored in the second correspondence storage unit.

10. The image decoding apparatus of claim 8, wherein each of the decoders includes a decoded data storage unit that stores a corresponding decoded piece of partial data obtained through decoding, and the image decoding apparatus further comprises a generation unit operable to generate, from a plurality of decoded pieces of partial data obtained through decoding, decoded image data corresponding to the encoded image data, the generation of the decoded image data performed by using the correspondence between the identifiers of the plurality of pieces of the partial data to be decoded by the determined decoders and the identifiers of the determined decoders indicated by the correspondence information stored in the second correspondence storage unit.

11. An image decoding apparatus that decodes encoded image data composed of a plurality of pieces of partial data, the image decoding apparatus comprising:

a plurality of decoders;

an attribute information acquisition unit operable to acquire attribute information pieces each (i) affecting decoding processing time of a corresponding one of the plurality of pieces of partial data, and (ii) including at least a data amount of the corresponding one of the plurality of pieces of partial data;

a processing ability acquisition unit operable to acquire, from each of the decoders, an information piece indicating a processing ability of a corresponding one of the decoders, the processing ability indicating a data amount that the decoder is able to process per unit time;

a determination unit operable to determine which decoder decodes which of the plurality of pieces of partial data based on the acquired attribute information pieces on the plurality of pieces of partial data and the acquired information pieces indicating the processing ability of the corresponding one of the decoders; and a decoding unit operable to cause two or more of the decoders which have been determined in the determination unit to decode two or more corresponding pieces of the partial data in parallel, wherein the encoded image data corresponds to a single video stream, the decoders are capable of being changed such that a decoder not included in the decoders before the change is included in the decoders after the change and such that a decoder included in the decoders before the change is no longer included in the decoders after the change, and each of the plurality of pieces of partial data includes an identifier, and the image decoding apparatus further comprises:

a first correspondence storage unit operable to store correspondence information in which the identifiers of the plurality of pieces of the partial data are in correspondence with identifiers of the decoders; and an allocation data generation unit operable to generate, according to the determination made by the determination unit, allocation data for each of the determined decoders, and to output the allocation data for each of the determined decoders to the decoding unit, the allocation data for a given one of the determined decoders including one or more corresponding pieces of partial data to be decoded by the given one of the determined decoders, data required for the given one of the determined decoders to decode the one or more corresponding pieces of partial data, and the correspondence information, wherein the determination unit causes the first correspondence storage unit to store identifiers indicating the determined decoders in correspondence with identifiers of the plurality of pieces of partial data to be decoded by the determined decoders, each of the decoders includes a second correspondence storage unit, the second correspondence storage unit of a given decoder obtaining and storing the correspondence information included in the allocation data corresponding to the given decoder, and the decoding unit causes the determined decoders to decode the plurality of pieces of partial data to be decoded by the determined decoders indicated by the corresponding identifiers stored in the correspondence storage unit.

12. The image decoding apparatus of claim 11, further comprising
a generation unit operable to generate, from a plurality of decoded pieces of partial data obtained through the decoding by the determined decoders, decoded image data corresponding to the encoded image data, the generation of the decoded image data performed by using the correspondence between the identifiers of the plurality of pieces of the partial data to be decoded by the determined decoders and the identifiers of the determined decoders indicated by the correspondence information stored in the second correspondence storage unit.

13. The image decoding apparatus of claim 11, wherein
each of the decoders includes a decoded data storage unit that stores a corresponding decoded piece of partial data obtained through decoding, and
the image decoding apparatus further comprises a generation unit operable to generate, from a plurality of decoded pieces of partial data obtained through decoding, decoded image data corresponding to the encoded image data, the generation of the decoded image data performed by using the correspondence between the identifiers of the plurality of pieces of the partial data to be decoded by the determined decoders and the identifiers of the determined decoders indicated by the correspondence information stored in the second correspondence storage unit.

14. The image decoding apparatus of claim 1, wherein
the determination unit determines which decoder decodes which of the plurality of pieces of partial data based on a value $mi/Pi$ for each of the decoders and such that all of the decoders have the same value $mi/Pi$, where $mi$ denotes a total data amount of one or more pieces of partial data to be allocated to the decoder and $Pi$ denotes a data amount that the decoder is able to process per unit time.

15. The image decoding method of claim 7, wherein
the determination step determines which decoder decodes which of the plurality of pieces of partial data based on a value $mi/Pi$ for each of the decoders and such that all of the decoders have the same value $mi/Pi$, where $mi$ denotes a total data amount of one or more pieces of partial data to be allocated to the decoder and $Pi$ denotes a data amount that the decoder is able to process per unit time.

16. The image decoding apparatus of claim 11, wherein
the determination unit determines which decoder decodes which of the plurality of pieces of partial data based on a value $mi/Pi$ for each of the decoders and such that all of the decoders have the same value $mi/Pi$, where $mi$ denotes a total data amount of one or more pieces of partial data to be allocated to the decoder and $Pi$ denotes a data amount that the decoder is able to process per unit time.

17. The image decoding apparatus of claim 1, wherein
based on the acquired attribute information pieces on the plurality of pieces of partial data and the acquired information pieces indicating the processing ability of the corresponding one of the decoders, the determination unit determines which of the decoders decodes a piece of partial data, among the plurality of pieces of partial data, whose data amount is larger than a data amount of another piece of partial data, among the plurality of pieces of partial data, the determined one or more of the decoders each having a processing ability greater than another one of the decoders that is caused to decode the another piece of the partial data.

* * * * *